(12) United States Patent
Mishima et al.

(10) Patent No.: US 7,180,548 B2
(45) Date of Patent: Feb. 20, 2007

(54) METHOD OF GENERATING FRAME INTERPOLATION IMAGE AND AN APPARATUS THEREFOR

(75) Inventors: Nao Mishima, Yokohama (JP); Kazuyasu Oowaki, Yokohama (JP); Goh Itoh, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 414 days.

(21) Appl. No.: 10/808,319

(22) Filed: Mar. 25, 2004

(65) Prior Publication Data
US 2004/0246374 A1 Dec. 9, 2004

(30) Foreign Application Priority Data
Mar. 28, 2003 (JP) ............................. 2003-090838

(51) Int. Cl.
*H04N 7/01* (2006.01)
(52) U.S. Cl. ..................................................... 348/441
(58) Field of Classification Search ................ 348/441, 348/459, 458, 443, 452
See application file for complete search history.

(56) References Cited

U.S. PATENT DOCUMENTS

| 6,205,259 | B1 * | 3/2001 | Komiya et al. ............. 382/284 |
| 6,466,269 | B1 * | 10/2002 | Someya et al. ............. 348/448 |
| 6,744,931 | B2 * | 6/2004 | Komiya et al. ............. 382/284 |
| 6,836,293 | B2 * | 12/2004 | Itoh et al. ................... 348/452 |
| 6,930,752 | B2 * | 8/2005 | Baba et al. .................. 352/38 |
| 7,098,959 | B2 * | 8/2006 | Mishima et al. ............ 348/459 |

FOREIGN PATENT DOCUMENTS

| JP | 6-334994 | 12/1994 |
| JP | 2528103 | 8/1996 |
| JP | 2000-125305 | 4/2000 |
| JP | 2001-24988 | 1/2001 |

* cited by examiner

*Primary Examiner*—Paulos M. Natnael
(74) *Attorney, Agent, or Firm*—Oblon, Spivak, McClelland, Maier & Neustadt, P.C.

(57) ABSTRACT

A method of generating an interpolation image includes inputting a first reference image, a second reference image and a third reference image of a video signal that continue in terms of time, generating a first interpolation image corresponding to a position of the second reference image from the first reference image and the third reference image, computing a correlation value expressing a correlation level between the second reference image and the first interpolation image, generating a second interpolation image corresponding to an interpolation position between the second reference image and the third reference image, and interposing the second interpolation image in the interpolation position when the correlation value is more than a threshold.

30 Claims, 20 Drawing Sheets

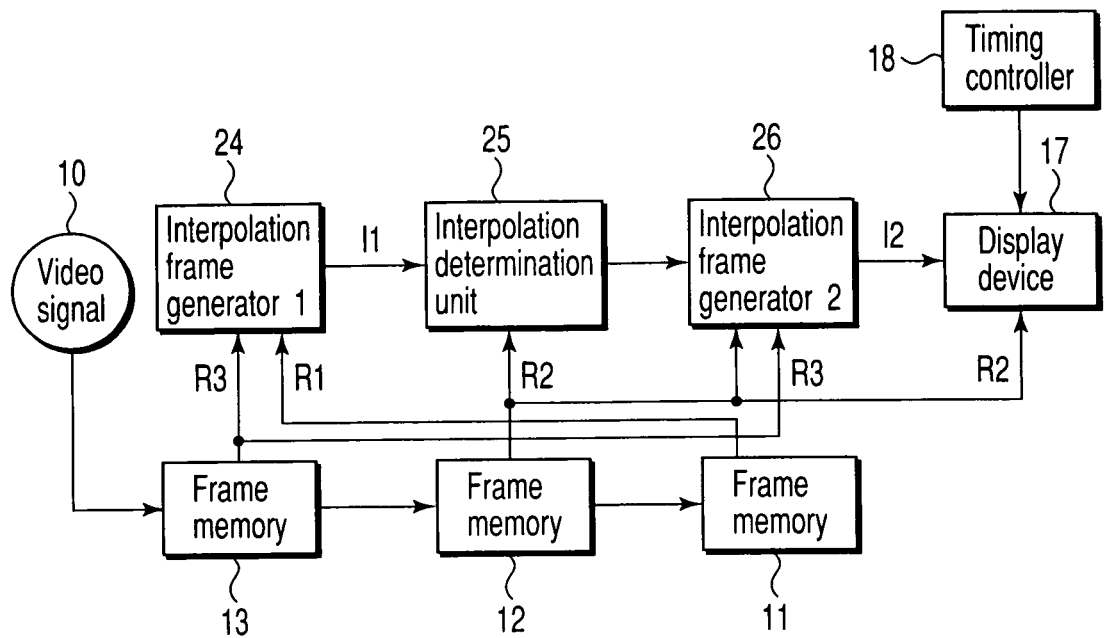
F I G. 16
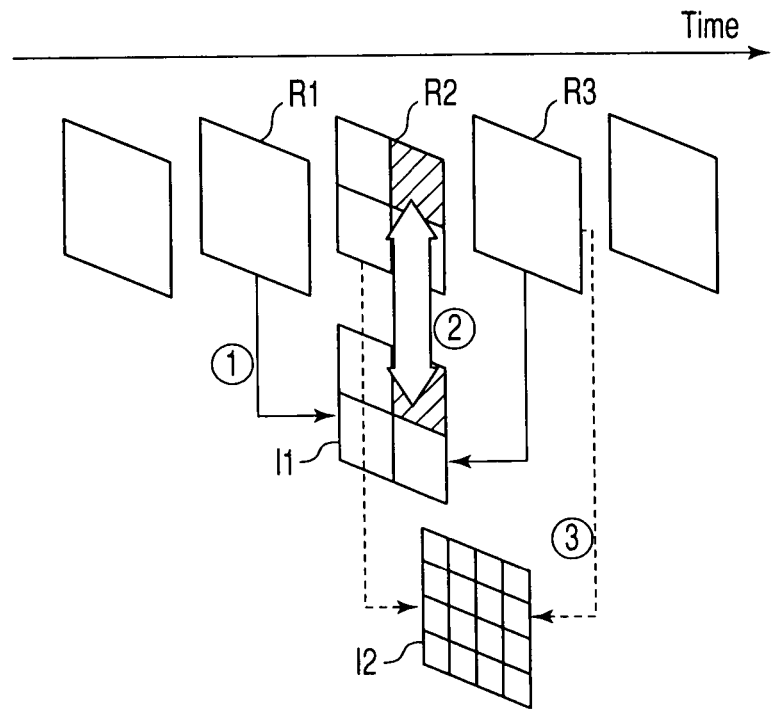
F I G. 17

METHOD OF GENERATING FRAME INTERPOLATION IMAGE AND AN APPARATUS THEREFOR

CROSS-REFERENCE TO RELATED APPLICATIONS

This application is based upon and claims the benefit of priority from prior Japanese Patent Application No. 2003-090838, filed Mar. 28, 2003, the entire contents of which are incorporated herein by reference.

BACKGROUND OF THE INVENTION

1. Field of the Invention

The present invention relates to a method for interpolating adjacent flames by at least one interpolation frame to shorten a display flame interval in reproducing a video. In a hold type image display unit which continues displaying a previous flame until a new image is written, for example, a liquid crystal display and an electro luminescence display, a blurring phenomenon by which the eyes of a viewer follow movement of a moving object or an unnatural movement due to display of an moving image of a few frames is a problem in displaying the moving image.

2. Description of the Related Art

This problem can be solved by shortening a display frame distance. As a method for realizing shortening the display frame distance, there is a method of generating an interpolation frame using motion compensation used in MPEG2 (Motion Picture Experts Group phase 2) and interposing the interpolation frame between the frames adjacent thereto. In the motion compensation in MPEG2, a motion vector detected by block matching method is used. The block matching method is a method including dividing a first reference frame into a plurality of first blocks, searching a second reference frame adjacent to the first reference frame for a second block having a maximum correlation with respect to each of the first blocks, and computing a motion vector from the second block to the first block.

In a frame interpolation method using such a motion compensation, when an interpolation frame is generated by the motion compensation, at first the motion vector between the first reference frame and the second reference frame is scaled to a second motion vector between the interpolation frame and the first reference frame. An interpolation frame is generated by carrying out the motion compensation by means of the second motion vector obtained by scaling. In other words, the end of the second motion vector is fixed on the first reference frame.

Image data of the block of the first reference frame that is indicated by the end of the second motion vector is copied to the block on the interpolation frame that is indicated by the starting point of the second motion vector.

In this method, the starting point position of the second motion vector provided by scaling does not always coincide with the position of an to-be-interpolated block on the interpolation frame. As a result, a clearance having no image data or a region on which images are superposed is formed on the interpolation frame.

Japanese patent No. 2528103 discloses a frame interpolation method without clearance between images or superposition of the image. In this prior method, the frame interpolation is carried out by computing a correlation between forward and backward reference frames that are geometrically symmetrical with respect to the to-be-interpolated block on the interpolation frame. As a result, an interpolation frame can be generated directly by a motion vector obtained first without scaling a motion vector. In addition, since the to-be-interpolated blocks on an interpolation are considered as blocks of the same lattice, the interpolation frame does not occur a clearance between images and superposition of images.

On the other hand, Japanese Patent Laid-Open No. 2001-24988 discloses a method for a motion compensation by computing a reliability of a motion compensation on the basis of a differential value between images in estimating a motion and a size of detected motion vector, and performing a compensation by another method when the reliability is low. Since the method of patent document 1 determine a motion vector only from a correlation between frames forward and backward the interpolation frame, the motion vector that reflects an actual movement is not always provided. For this reason, the quality of the interpolation frame deteriorates, resulting in deteriorating quality of the whole video.

On the other hand, the method of a patent document 2 may theoretically dissolve the problem of the deterioration of the interpolation frame due to erroneous detection of the motion vector in the patent document 1. However, it is difficult for it to be realistic to measure reliability of motion compensation only by a differential value between images in estimating a movement or a size of a motion vector. Therefore, it cannot generate always an appropriate interpolation frame.

It is an object of the present invention to provide an interpolation image generating method for generating an interpolation image with high quality, and an apparatus therefor.

BRIEF SUMMARY OF THE INVENTION

An aspect of the present invention provides a method of generating an interpolated image, comprising: inputting a first reference image, a second reference image and a third reference image of a video signal that continue in terms of time; generating a first interpolation image corresponding to a position of the second reference image from the first reference image and the third reference image; computing a correlation value between the second reference image and the first interpolation image; generating a second interpolation image corresponding to an interpolation position between the second reference image and the third reference image; and interposing the second interpolation image in the interpolation position when the correlation value is more than a threshold.

Another aspect of the present invention provides an apparatus to interpolate a video signal including a first reference image, a second reference image and a third reference image that continue in terms of time, comprising: a first generator to generate a first interpolation image put in a position of the second reference image, using the first reference image and the third reference image; a computation unit configured to compute a correlation value between the second reference image and the first interpolation image; a second generator to generate a second interpolation image put in an interpolation position between the second reference image and the third reference image; and an interpolation unit configured to interpolate the second interpolation image in the interpolation position when the correlation value is not less than a threshold to generate an interpolated video signal.

BRIEF DESCRIPTION OF THE SEVERAL VIEWS OF THE DRAWING

FIG. 16 is a block diagram of an image display system concerning the fourth embodiment of the present invention.

FIG. 17 is a conceptual diagram of a frame interpolation in the fourth embodiment.

DETAILED DESCRIPTION OF THE INVENTION

Figure 1:
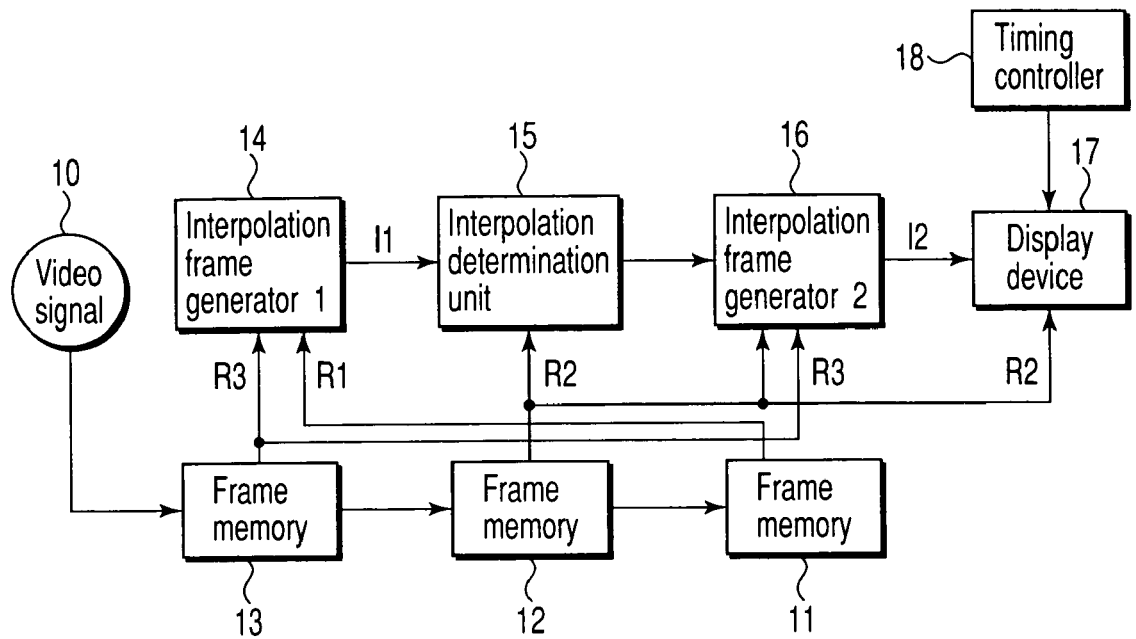
FIG. 1 is a block diagram of an image display system concerning the first embodiment of the present invention.

There will now be described the embodiment of the present invention referring to the drawing.

First Embodiment

FIG. 1 shows configuration of a video display system related to the first embodiment of the present invention. An example that an input image signal (video signal) 10 is a non-interlace signal (progressive signal) of 60 Hz is converted to a non-interlace signal of 120 Hz will be described. A frame interpolation is realized by generating an interpolation frame on a time center position (interpolation position) between two images, i.e., two frames adjacent to the interpolation frame, and interposing it between two reference frames.

The video signal 10 is input to a frame memory 13, the output of frame memory 13 to a frame memory 12, and the output of the frame memory 12 to a frame memory 11. Assuming that pictures held in the frame memories 11, 12 and 13 are the first, second and third reference frames R1, R2 and R3. The video signal 10 is input by reference frames R1, R2 and R3 in this order.

A first interpolation frame generator 14 generates a first interpolation frame I1 corresponding to a position of the reference frame R2 between the reference frames R1 and R3. An interpolation determination unit 15 inspects quality of the interpolation frame I1 from the reference frame R2 and interpolation frame I1 and determines whether or not the interpolation is carried out based on an inspection result. The second interpolation frame generator 16 generates a second interpolation frame I2 corresponding to a time center position (interpolation position) between the reference frames R2 and R3 when carrying out an interpolation according to a determination result of interpolation determination unit 15.

The second interpolation frame I2 is sent to the display system 17 along with the reference frames R1, R2 and R3. In the display system 17, the interpolation frame I2 is interposed between the reference frames R2 and R3 under control of a timing controller 18, and a video subjected to the frame interpolation is displayed.

An operation of the present embodiment is explained. By interposing an interpolation frame between adjacent frames by the frame interpolation, a smoother moving image can be played back. However, there is no guarantee that an appropriate interpolation frame can be always generated. If an interpolation frame of low quality is generated and interposed between adjacent frames, quality of the whole video deteriorates. In the present embodiment, a step to inspect quality of the interpolation frame I1 is provided. It is determined according to an inspection result whether or not the interpolation carried out by interposing the interpolation frame I2 is executed. This can evade a problem to deteriorate quality of the whole video due to the interpolation frame of low quality.

Figure 2:
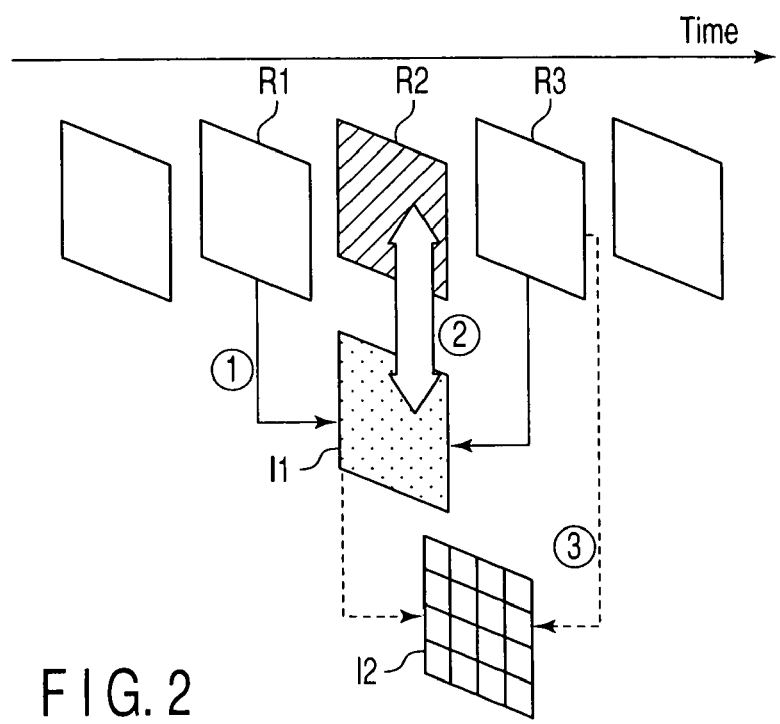
FIG. 2 is a conceptual diagram of a frame interpolation in the first embodiment.

As shown in FIG. 2 that is a conceptual diagram of the frame interpolation of the present embodiment, there are executed processes of: (1) generating the first interpolation frame I1 corresponding to a position of the second reference frame R2 from the first and third reference frames R1 and R3; (2) inspecting quality of interpolation frame I1 with a correlation value obtained by comparing the interpolation frame I1 with the reference frame R2; and (3) carrying out an interpolation by obtaining the second interpolation frame I2 from the second and third reference frames R2 and R3 and interposing it between is the reference frames R2 and R3, if quality of the inspected interpolation frame I1 is high, that is, if the correlation value is not less than a threshold.

Figure 3:
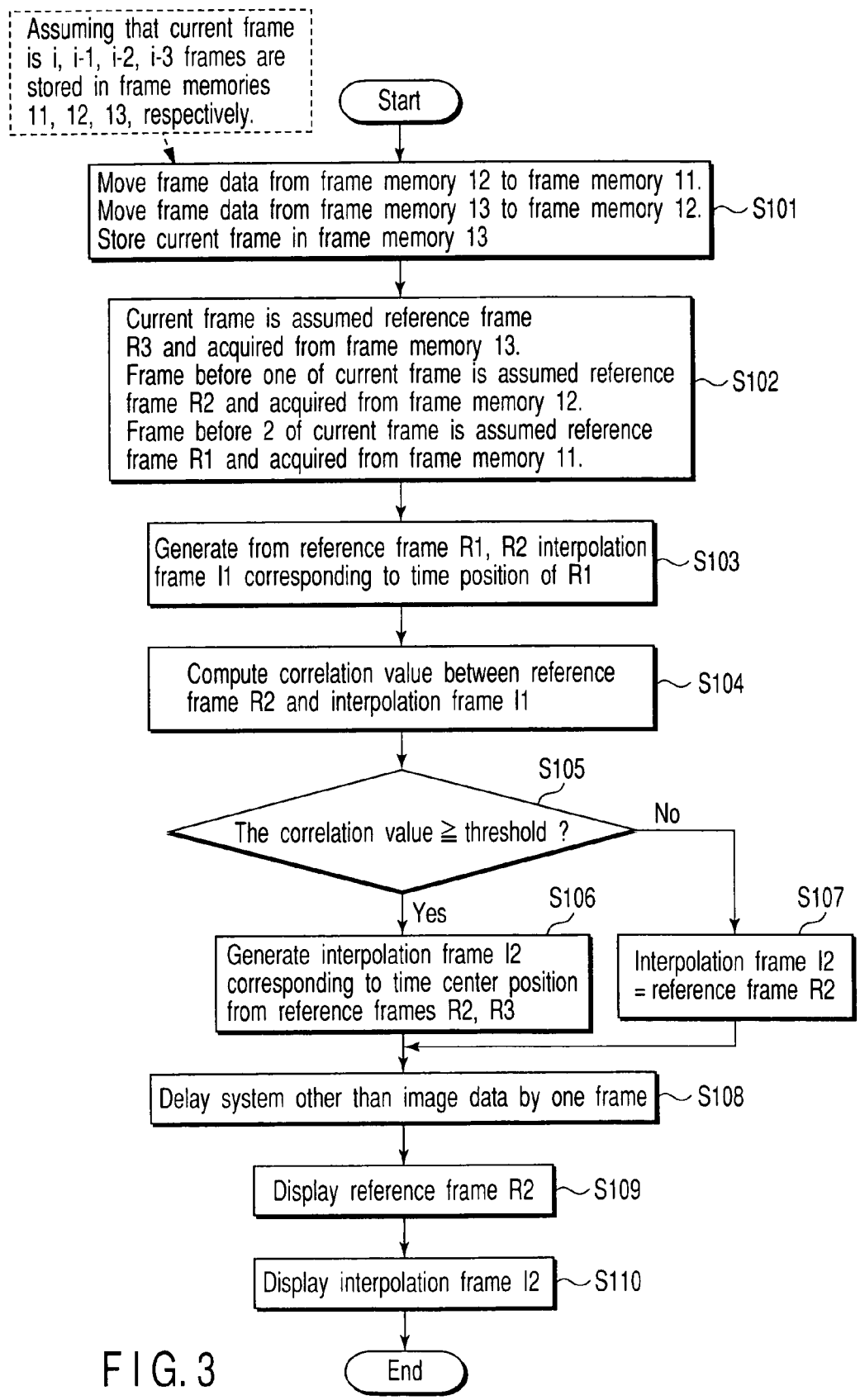
FIG. 3 is a flow chart of a process of a frame interpolation in the first embodiment.

There will be described a concrete process procedure in the present embodiment in conjunction with a flow chart shown in FIG. 3 hereinafter.

<Operation of the Frame Memories 11–13>

Figure 4:
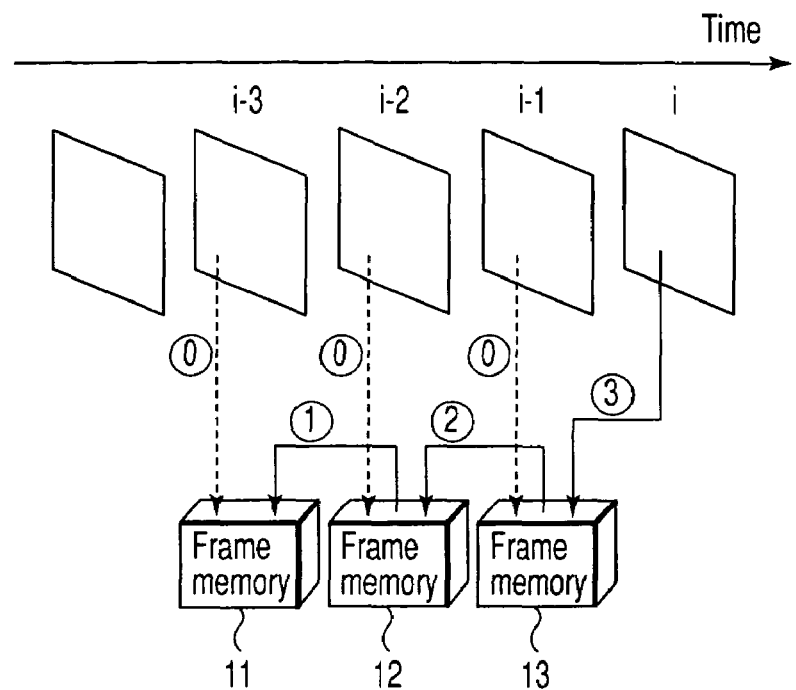
FIG. 4 is a diagram of explaining a transfer of frame data between frame memories in the first embodiment.

The video signal 10 is input as continuous frame data in units of frames input sequentially. As shown in FIG. 4, assuming that the frame data that has been input at a certain moment is an i frame. It is assumed from past accumulation that data of i-3, i-2 and i-1 frames are stored in the frame memories 11, 12 and 13 respectively (as shown at 0 in FIG. 4). After i frame is input, frame data of the frame memories 11, 12 and 13 change as follows.

(1) The frame data in the frame memory 12 is moved to the frame memory 11;

(2) The frame data in frame memory 13 is moved to frame memory 12; and (3) The input i frame is stored in the frame memory 13.

As thus described, the frame data of i-2, i-1 and i frames are stored in the frame memories 11, 12 and 13 respectively (step S101).

In convenience, the frame data of the frame memories 11, 12 and 13 are defined as the first, second and third reference frames R1, R2 and R3. To access the frame data of the frame memories 11, 12 and 13 equalizes to access the reference frame R1, R2, frame data of R3.

In step S102, the frame (current frame) of a currently input video signal is derived from the frame memory 13 as the reference frame R3. A frame before one frame from the current frame is derived from the frame memory 12 as the reference frame R2. A frame before two frames from the current frame is derived from frame memory 11 as the reference frame R1. The first interpolation frame I1 is generated as follows.

<Process of the First Interpolation Frame Generator 14>

According to the first interpolation frame generator 14, in generating the first interpolation frame I1, at first a motion vector between the frames R2 and R3 is obtained from the first and third reference frames R1 and R3, and then the first interpolation frame I1 corresponding to a time position of the second reference frame R2 is generated (step S103). An interpolation frame generation method for generating the interpolation frame I1 is not limited in particular, but it can be selected from, for example, the following various interpolation frame generation methods.

(1) The First Interpolation Frame Generation Method

Figure 5:
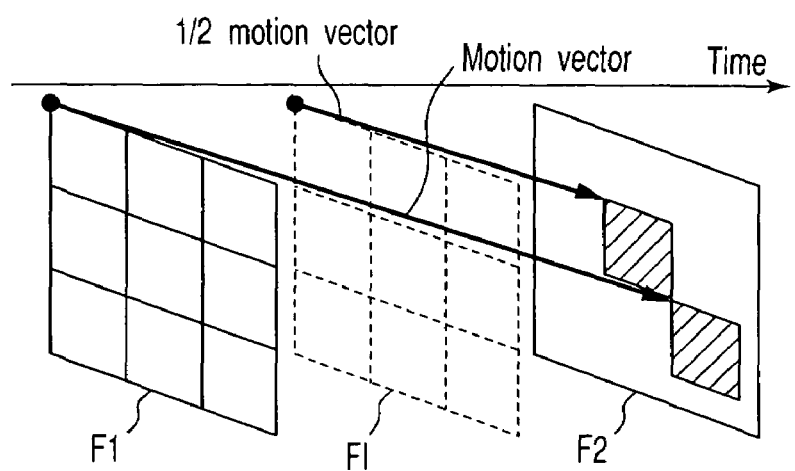
FIG. 5 is a diagram for explaining an example of a method of generating the first interpolation frame according to the first embodiment.

As shown in FIG. 5, the frame F1 is divided into small blocks, the frame F2 is searched for a block with a highest correlation with respect to an object one of the small blocks to derive a motion vector, and the motion vector is scaled to ½. The start point of the scaled motion vector is fixed at the small block on the interpolation frame FI that is on the same position as the small block of the frame F1, and the block on the frame F2 that is set by the motion vector is copied to a position of the small block on the interpolation frame FI. The interpolation frame FI is generated by doing the above serial process to all divided small blocks.

The process is executed by dividing the frame F1 into small blocks, so-called forward movement estimation. However, it may be executed by dividing the frame 2 into blocks, so-called backward motion estimation. In addition, the process may be carried out by generating the interpolation frame FI by selecting a motion vector obtained by the frames F1 and F2 and having a highest correlation therebetween, so-called bi-directional motion estimation.

(2) The Second Interpolation Frame Generation Method

Figure 6:
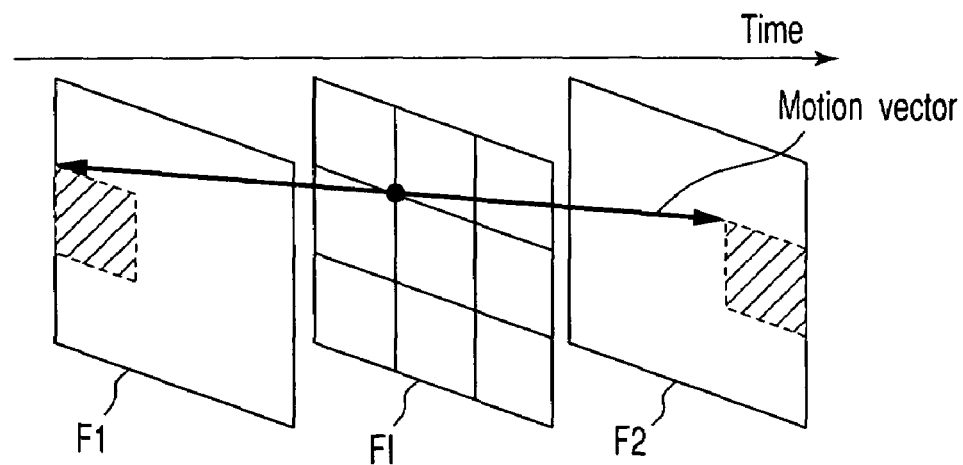
FIG. 6 is a diagram for explaining another example of a method of generating the first interpolation frame according to the first embodiment.

As shown in FIG. 6, the interpolation frame FI is divided into small blocks, and a pair of small blocks on the frames F1 and F2 that are point-symmetric with respect to an object small block and have a highest correlation to derive a motion vector are searched to derive a motion vector. An average of a block on the frame F1 and a block on the frame F2 which are defined by the motion vector is calculated. The average block is copied to a position of the small block on the interpolation frame. Carrying out the above serial process for all divided small blocks generates the interpolation frame.

(3) The Third Interpolation Frame Generation Method

Figure 7:
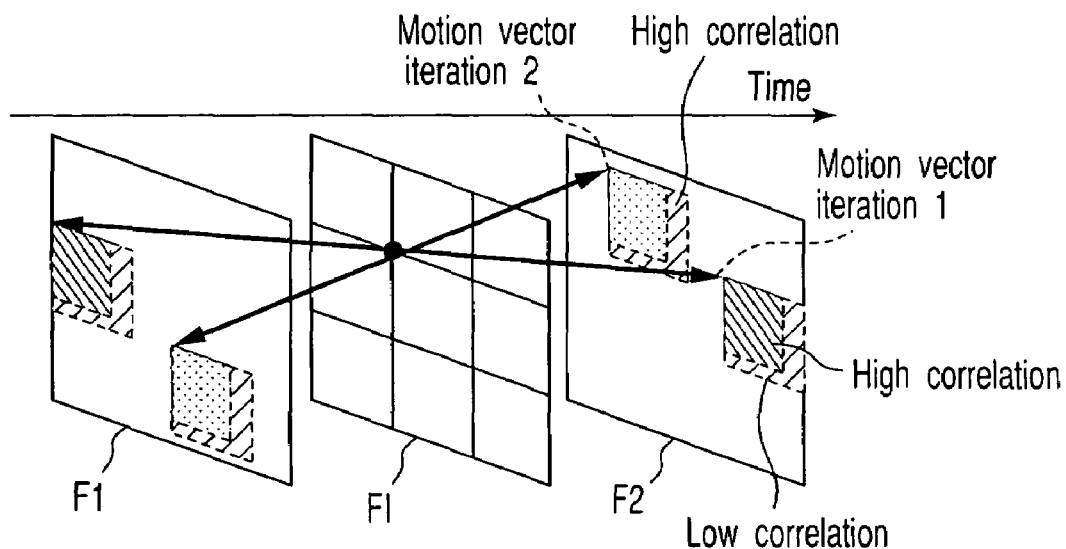
FIG. 7 is a diagram for explaining a still another example of a method of generating the first interpolation frame according to the first embodiment.

The first and second interpolation frame generation methods both are a technique of a block base, and assume that there is only one motion in a block basically. For this reason, when there are a plurality of motions, a block distortion may occur in a border between the motions. In contrast, in the third interpolation frame generation method, in order to prevent such a block distortion from generating is selected a method of dividing a block into a high correlation region and a low correlation region, assigning a motion vector to the high correlation region, and searching the low correlation regions recursively, as shown in FIG. 7.

<Process of Interpolation Determination Unit 15>

Comparing the first interpolation frame I1 with the second reference frame R2 inspects the quality of the interpolation frame I1. It is determined whether or not interpolation is carried out according to an inspection result.

In other words, a correlation value expressing a level of a correlation between reference frame R2 and interpolation frame I2 is computed (step S104). If the correlation value is not less than a threshold, it is determined that the quality of interpolation frame I1 is high. If it is less than the threshold, it is determined that the quality is low (step S105). According to a result of this determination, the second interpolation frame I2 is generated as described below.

An evaluation value concerning the quality is set. It is determined according to the evaluation value with respect to the threshold whether or not the interpolation is to be done. If the evaluation value decreases with an increase in the quality, it may be determined to do the interpolation when the evaluation value is less than the threshold. If the evaluation value increases with an increase in the quality, it may be determined to do the interpolation when the evaluation value is not less than the threshold. If the evaluation value is considered as the correlation value between the reference frame R2 and the interpolation frame I2 the former "the evaluation value is less than the threshold" and the latter "the evaluation value is not more than the threshold" correspond to "the correlation value is not less than the threshold". For example, the following some values may be used for the evaluation value.

An example based on a frame-to-frame difference of the luminance component of a video signal will be described hereinafter. The first case is an evaluation value referred to as a mean squared error (MSE), and can be expressed as follows.

$$MSE = \frac{1}{NM} \sum_{x=1}^{N} \sum_{y=1}^{M} (f_{ref}(x, y) - f_{comp}(x, y))^2 \quad (1)$$

$f_{ref}(x,y)$ expresses a luminance value in a point (x,y) of a reference image (corresponding to the second reference frame R2), $f_{comp}(x,y)$ indicates a luminance value in a point (x,y) of an interpolation image (corresponding to the interpolation frame I1), and (N,M) expresses an image size. The above case is an example computing for the whole image, but the image size may be arbitrarily determined, and a part of the image may be an object. An evaluation value of equation (1) expresses that the quality increases as it decreases.

The second case is an evaluation value referred to as Subjective Mean Squared Error (SMSE). This is an evaluation value considering a characteristic of a human eye based on MSE, and expressed as follows.

$$SMSE = \left( \frac{1}{NM} \sum_{x=1}^{N} \sum_{y=1}^{M} |d(x, y)|^p \right)^{\frac{1}{p}} \quad (2)$$

$$d(x, y) = (\alpha(x, y)g(f_a(x, y) - f_b(x, y)))$$

$f_{ref}(x,y)$ expresses a luminance value in a point (x,y) of a reference image (corresponding to the second reference frame R2) and $f_{comp}(x,y)$ indicates a luminance value in a point (x,y) of an interpolation image (corresponding to the interpolation frame I1)(N,M) expresses an image size, g(x,y) a recognition of an error, and α(x,y) a weight of a point (x,y). p expresses a variable determining a relation between importance of a small error and that of a big error. For example, the following equation (3) can be used for g(x,y), α(x,y), and p.

$$g(x,y) = M_{2\times 2}(f_{ref}(x,y)) - M_{2\times 2}(f_{comp}(x,y))$$

$$\alpha(x,y) = 1, P = 3 \quad (3)$$

$M_{2\times 2}$ (f(x,y)) expresses a linear average in a window of 2*2 size. This describes a lowpass characteristic of a human eye. Similarly to MSE of the equation (1), the above case is an example computing for the whole image, but the image size may be arbitrarily determined, and a part of the image may be an object. SMSE of the equation (2) represents that the quality increases as SMSE decreases similarly to MSE of the equation (1).

There will be explained an evaluation value paid attention to a color-difference signal of an image. This can be obtained by expanding MSE of the equation (1) and SMSE of the equation (2). In MSE, f(x,y) is assumed a luminance component of a video signal. However, this may be substituted for a color difference component of the video signal. f(x,y) in the equation (1) may be replaced with a color-difference signal Cb to be MSE [Cb]. f(x,y) in the equation (1) may be replaced with a color-difference signal Cr to be MSE [Cr]. Similarly about SMSE, f(x,y) in the equation (2) may be replaced with color-difference signals Cb and Cr to be SMSE [Cb] and SMSE [Cr]. The above condition expresses that the smaller all of MSE [Cb], MSE [Cr], SMSE [Cb] and SMSE [Cr] become in value, the higher the quality is.

It is possible to combine the evaluation value based on the above two luminance component and evaluation value based on the color difference component to use. The evaluation value using all of the luminance component and color difference component can use the following value.

$$MSE[YCbCr] = MSE + MSE[Cb] + MSE[Cr] \quad (4)$$

$$SMSE[YCbCr] = SMSE + SMSE[Cb] + SMSE[Cr] \quad (5)$$

The equations (4) and (5) are ones obtained by expanding MSE and SMSE, and show that quality increase as they decrease.

The pixels agreeing between two frames are counted to obtain the number of pixels. The maximum matching pel count (MPC) assuming that the pixels that are larger in number have high quality is defined as another evaluation value. This evaluation value is expressed as follows.

$$MPC = \sum_{x=1}^{N} \sum_{y=1}^{M} \begin{cases} 1 (|f_{ref}(x, y) - f_{comp}(x, y)| < T) \\ 0 \quad \text{(otherwise)} \end{cases} \quad (6)$$

$f_{ref}(x,y)$ expresses a luminance value in a point (x,y) of a reference image (corresponding to the second reference frame R2) and $f_{comp}(x,y)$ indicates a luminance value in a point (x,y) of an interpolation image (corresponding to the interpolation frame I1)(N,M) expresses an image size, and T a threshold. In here, an example computing for the whole image is described. However, the size may be arbitrarily determined, and a part of the image may be an object. This validation criterion means that the quality increases as the evaluation value increases. About MPC, MPC[Cb] and MPC[Cr] can be derived with respect to the color-difference signal similarly to MSE. f(x,y) in the equation (5) may be replaced with the color-difference signals Cb and Cr. The evaluation value based on the luminance component and that based on the color difference component may be combined with each other as follows.

$$MPC[YCbCr] = MPC + MPC[Cb] + MPC[Cr] \quad (7)$$

The following process for matching with another evaluation permits to express that the quality increases as the evaluation value decreases.

$$MPC' = NM - MPC \quad (8)$$

The following evaluation value uses a cross-correlation function (CCF).

$$CCF = \frac{\sum_{m=1}^{M} \sum_{n=1}^{N} f_{comp}(m, n) f_{ref}(m, n)}{\left[ \sum_{m=1}^{M} \sum_{n=1}^{N} f_{comp}(m, n)^2 \right]^{1/2} \left[ \sum_{m=1}^{M} \sum_{n=1}^{N} f_{ref}(m, n)^2 \right]^{1/2}} \quad (9)$$

Without using a differential value of luminance, a multiplication value of luminance/division value is used. This evaluation value shows that a correlation increases as it closes to 1.0. However, it is possible by carrying out the following process to match the evaluation value with another parameter to express that the quality increases as the evaluation value decreases.

$$CCF' = 1.0 - CCF \quad (10)$$

It is possible by replacing f(x,y) in the equation (9) with the color-difference signals Cb and Cr to obtain CCF [Cb] and CCF [Cr] with respect to the color-difference signal similarly to another evaluation value. It is possible to combine the evaluation value based on the luminance component and the evaluation value based on the color difference component to use. This can express as follows.

$$CCF'[YCbCr] = CCF'' + CCF'[Cb] + CCF'[Cr] \quad (11)$$

The threshold can be set by, for example, PSNR (peak signal to noise ratio). Acceptability limit in PSNR is considered to be 32[dB] conventionally. An MSE value corresponding to the acceptability limit is 41.0279. Accordingly, if the threshold is set to 41.0279, it can be assumed that an interpolation is not done when it is less than the acceptability limit.

<Process of the Second Interpolation Frame Generator 16>

According to the above interpolation determination, that is, a result of comparing a correlation value between the second reference frame R2 and the first interpolation frame I1 with the threshold in step S105, when the correlation value is not less than the threshold, that is, it is determined that interpolation be carried out, the second interpolation frame I2 corresponding to a time center position between the second and third reference frames R2 and R3 is generated using a motion vector (step S106).

In a case that it is determined that an interpolation is to be carried out, it is possible to generate the second interpolation frame I2 using various interpolation frame generation methods as shown in FIGS. 5, 6 and 7 like generation of the second interpolation frame I2. On the other hand, when the correlation value is less than the threshold, that is, it is determined that the interpolation is not carried out, the second reference frame R2 is output as it is (step S107).

<Process of Visual Display Unit 18>

In displaying an image on the display unit 17, an output timing of a system other than a video display system, for example, a speech system is delayed by one frame (1/60 sec. in this case) of the video signal under control of the timing controller 18 (step S108). The second reference frame R2 is displayed in sync with the display timing of the image (step S109). The second interpolation frame I2 is displayed after 1/120 second (step S110). It is assumed that processes from generation of the first interpolation frame I1 to generation of the second interpolation frame I2 are finished within 1/60 second.

In the present embodiment as thus described, the quality of interpolation frame is inspected. When it is determined that quality of interpolation frame is low, the interpolation is not carried out. By such a manner, it is possible to avoid a problem of degrading the whole quality of the moving image that occurs when the interpolation frame of low quality is interposed in an interpolation position.

An original frame does not exist in the interpolation position at which an interpolation frame is to be interposed. For this reason, the conventional manner cannot inspect the quality of interpolation frame surely. In contrast, in the present embodiment, the quality of the interpolation frame is inspected by obtaining an interpolation precision in positions of adjacent frames by doing an interpolation with respect to the adjacent frames, and predicting an interpolation accuracy of an interpolation position based on the former interpolation precision. Since the adjacent frames and the interpolation frame are near to each other in time interval, to predict the inspection result in the adjacent frame positions so that in the interpolation position is considered to be proper in view of a time continuity of the moving image.

On the other hand, there is a case where a time continuity of a moving image cannot be supposed. As such an example, for example, occurrence of a scene change is presumable. When the scene change occurs, the frame before the scene change point has no continuity with respect to the following frame. In other words, both frames are quite different in image from each other. An operation of the present embodiment at the time of scene change is described in conjunction with FIGS. 8 and 9, hereinafter.

Figure 8:
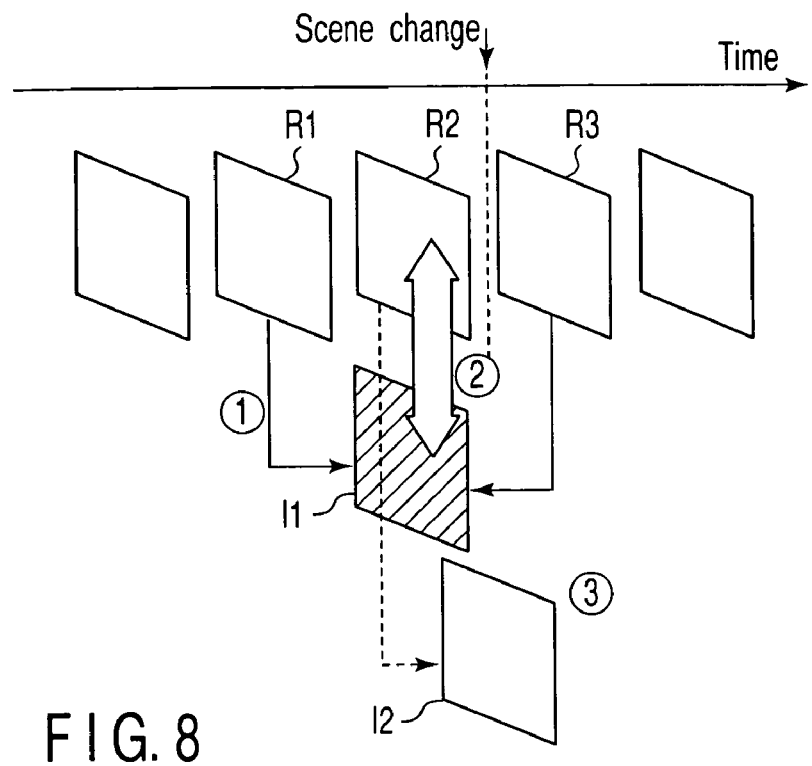
FIG. 8 is a diagram showing an example of a frame interpolation operation of scene change in the first embodiment.
Figure 9:
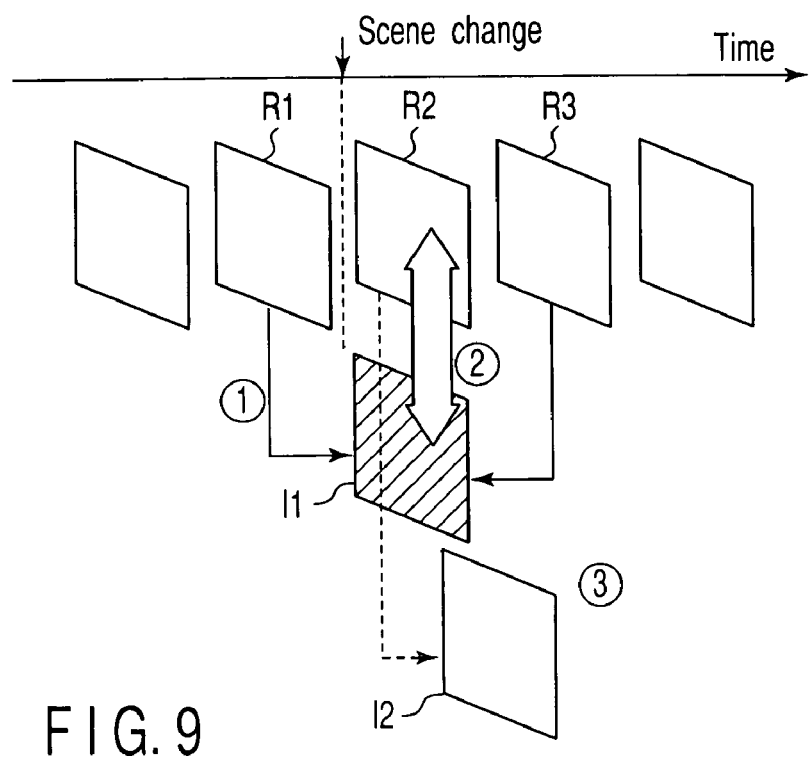
FIG. 9 is a diagram showing an example of another frame interpolation operation in scene change in the first embodiment.

FIG. 8 shows an operation when an interpolation frame is interposed in a scene change part. When the first interpolation frame I1 is generated, since the interpolation frame I1 is formed from an image before the scene change and an image after the scene change, the generated interpolation frame becomes a frame formed of an upper half of the previous frame and a lower half of the following frame. Since such an image is no good with respect to matching with the second reference frame R2, the evaluation value of an interpolation determination becomes very bad. Thus, the determination that the interpolation is not executed is reached, and the second reference frame R2 is interposed in the interpolation position as it is.

As thus described, an inappropriate and unstable interpolation frame is not interposed at the time of scene change. Therefore, it is found that an interpolation determination is done justly. The above operation is similar to the case of FIG. 9. In other words, it is understood that if continuity of a moving image cannot be assumed, an interpolation determination function acts normally.

Second Embodiment

Figure 10:
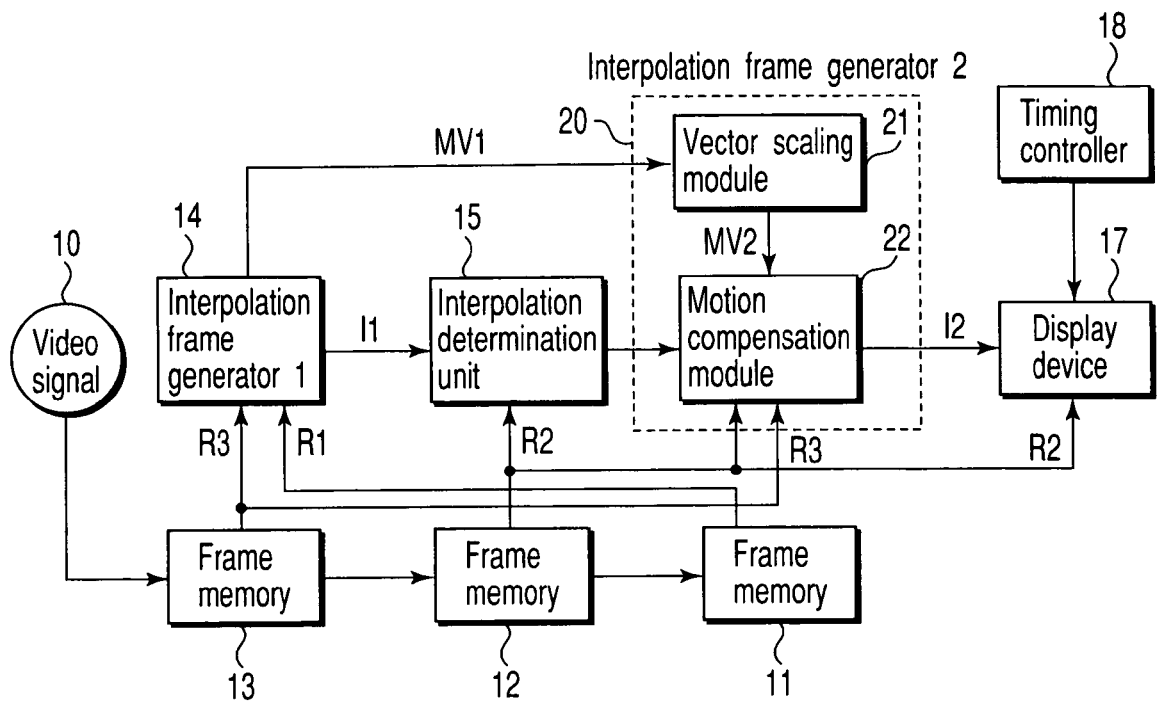
FIG. 10 is a block diagram of an image display system concerning the second embodiment of the present invention.

FIG. 10 shows an image display system concerning the second embodiment of the present invention. The second interpolation frame generator 20 comprises a vector scaling module 21 which scales a first motion vector MV1 input from a first interpolation frame generator 14 and a motion vector motion compensation module 22 compensating a motion vector using a scaled second motion vector MV2.

There will be described an embodiment similar to the first embodiment wherein an input image signal (video signal) is a non-interlaced signal of 60 Hz, an interpolation frame is generated in a time center position (interpolation frame position) between two reference frames adjacent with respect to the non-interlaced signal of 60 Hz, and a non-interlaced signal of 120 Hz is generated by interposing the interpolation frame between the two reference frames.

Similarly to the first embodiment, in the present embodiment, for the purpose of preventing an image quality of the whole video from being deteriorated by interposing an interpolation frame of low quality, the quality of generated interpolation frame is inspected, and if it is determined that the quality is low, the interpolation is not carried out. The configuration that the second interpolation frame generator 15 generates the second interpolation frame I2 using a motion vector MV1 provided with the first interpolation frame generator 14 differs from the first embodiment. By doing so, a total computation time can be decreased in half.

A process routine of the frame interpolation in the present embodiment will be described referring to FIGS. 11 and 12. A generation process of the first interpolation frame I1 from steps S201 to S203, an interpolation determination process from steps S204 and S205, and a display process from steps S208 to S210 in FIG. 12 are omitted from explanation because they are similar to the first embodiment. Only a generation process of the second interpolation frame I2 will be described hereinafter.

<Second Interpolation Frame Generator 20>

Figure 11:
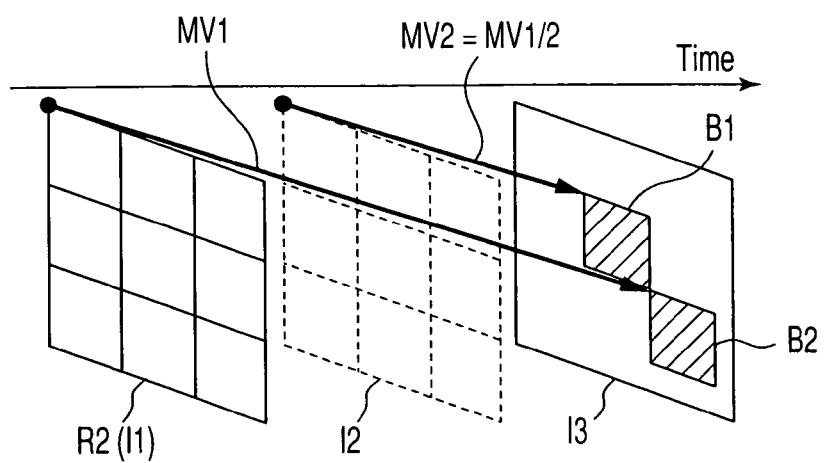
FIG. 11 is a diagram for explaining a method of generating the second interpolation frame according to the second embodiment.
Figure 12:
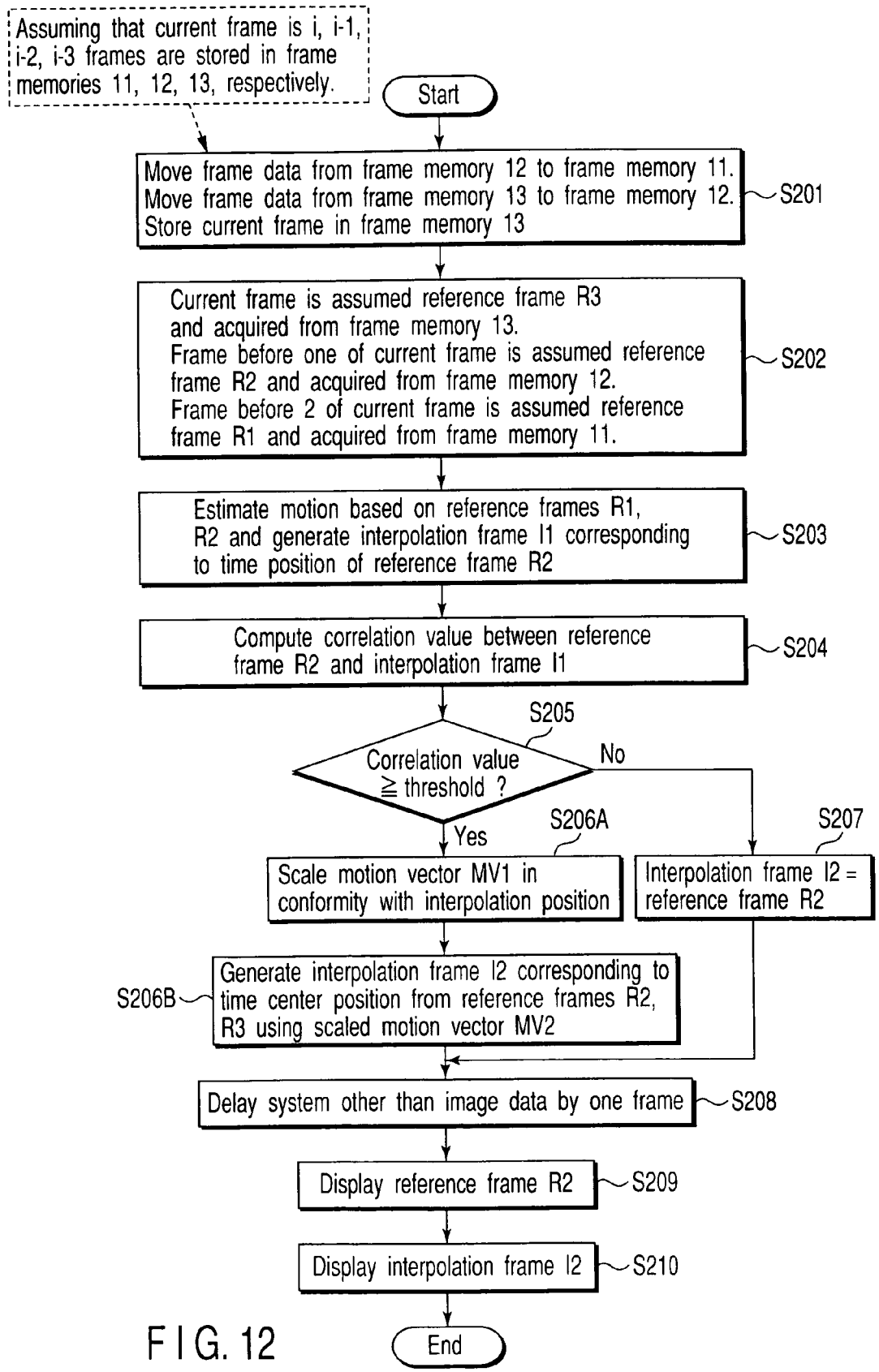
FIG. 12 is a flow chart of a process of a frame interpolation in the second embodiment.

In generating the second interpolation frame, when a correlation value between the reference frame R2 and the second interpolation frame I1 is not less than a threshold in step S205, that is, when it is determined to carry out an interpolation, at first the first motion vector MV1 provided with the first interpolation frame generator 14 is scaled according to an interpolation position of the interpolation frame I2 to generate a second motion vector MV2, as shown in FIG. 11 (Step S206A).

The second interpolation frame I2 is generated by carrying out a motion compensation using the scaled second motion vector MV2 and the second reference frames R2 and R3 (step S206B). On the other hand, when the correlation value is less than the threshold, that is, it is determined that the interpolation is not done in step S205, the second reference frame R2 is output as it is (step S207). The process of the vector conversion step S206A and motion compensation step S206B will be further concretely explained.

<Vector Scaling Step>

In the vector scaling step S206A, the motion vector MV1 provided in generating the first interpolation frame is scaled, that is, the length of the vector is converted to make the second motion vector MV2. In this case, for the purpose of interposing the second interpolation frame I2 in a time center position between the second and third reference frames R2 and R3, the length of the first motion vector MV1 is reduced to ½ to generate the second motion vector MV2. Concretely, assuming that MV1=(Vx, Vy), MV2=(sVx, sVy) is calculated by $sVx=\frac{1}{2}*Vx$, $sVy=\frac{1}{2}*Vy$.

<Motion Compensation Step>

In the motion compensation step S206B, the motion compensation is done using the block B1 on the third reference frame R2 that is indicated by the scaled second motion vector MV2 provided in step S206A to generate the interpolation frame I2. The motion compensation will be described referring to FIG. 12.

The interpolation frame I1 is divided into small blocks in generating the first interpolation frame I1. In this case, the small block similar to the above small block is supposed on the interpolation frame I2 between the second and third reference frames R2 and R3. A motion vector corresponding to each small block on the interpolation frame I2 is the motion vector MV2 reduced to ½ in length. The block B1 on the third reference frame R3, that is indicated by the motion vector MV2, is subjected to motion compensation. In other words, the interpolation frame I2 is generated by copying the block B1 to the small block position on the interpolation frame I2.

According to the present embodiment, a problem of degrading quality of the whole video image that occurs by interposing an interpolation frame of low quality can be avoided by providing an option of inspecting quality of the interpolation frame and not executing the interpolation when it is determined that the quality of interpolation frame is low, similarly to the first embodiment. At the same time, a computation time can be reduced to ½ by reusing the second motion vector obtained in generating the first interpolation frame I1 for generation of the second interpolation frame I2.

Third Embodiment

Figure 13:
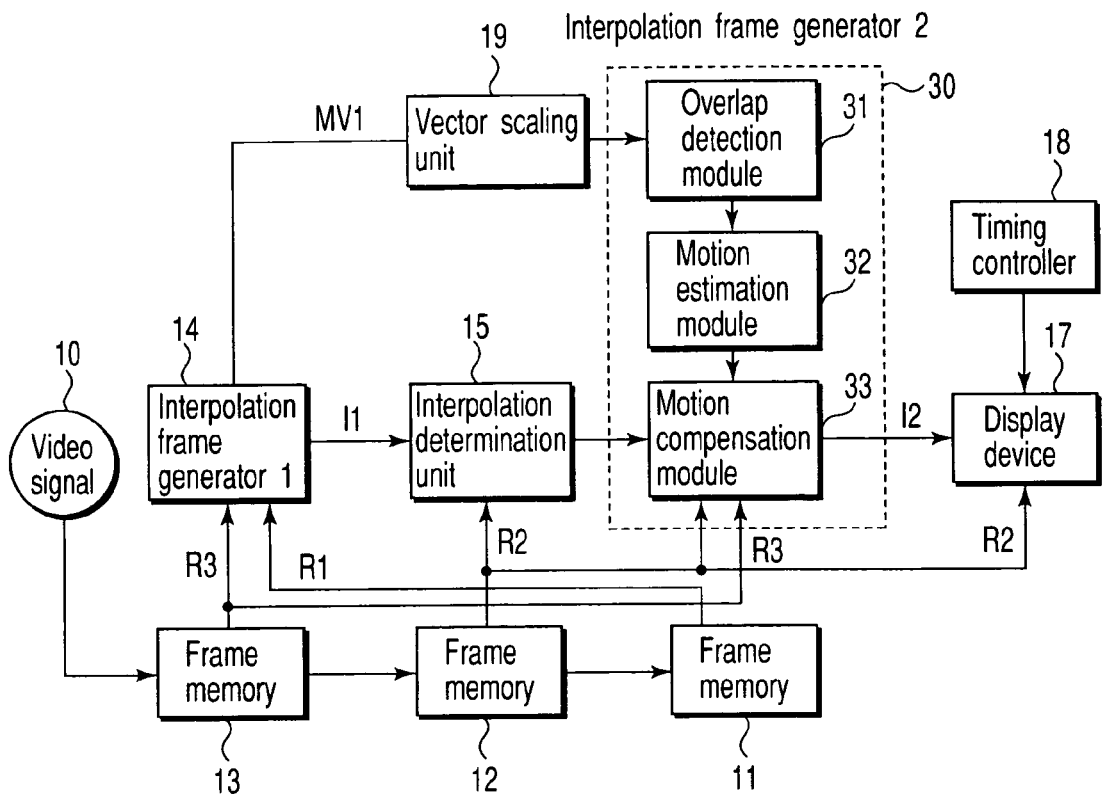
FIG. 13 is a block diagram of an image display system concerning the third embodiment of the present invention.

FIG. 13 shows an image display system concerning the third embodiment of the present invention. The system provides with a vector scaling unit 19 which scales the motion vector MV1 output from the first interpolation generator 14. The second interpolation frame generator 30 comprises an overlap detection module 31, a motion estimation module 32 and a motion compensation module 33.

Figure 14:
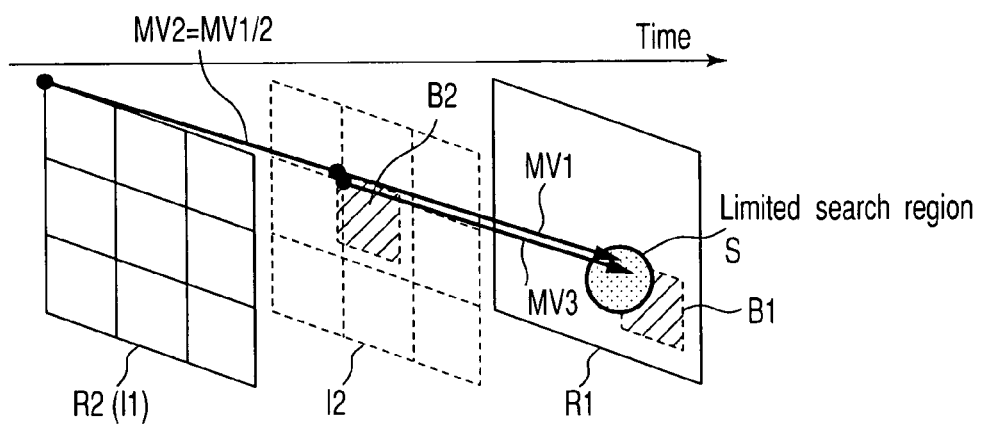
FIG. 14 is a conceptual diagram of a frame interpolation in the third embodiment.

A frame interpolation process in the present embodiment will be described using FIGS. 14 and 15. There will be described an embodiment similar to the first embodiment wherein an input image signal (video signal) is a non-interlaced signal of 60 Hz, an interpolation frame is generated in a time center position (interpolation frame position) between two reference frames adjacent with respect to the non-interlaced signal of 60 Hz, and a non-interlaced signal of 120 Hz is generated by interposing the interpolation frame between the two reference frames.

In the present embodiment similarly to the first embodiment, for the purpose of preventing an image quality of the whole video image from being deteriorated by interposing an interpolation frame of low quality, the quality of generated interpolation frame is inspected, and if it is determined that the quality is low, the interpolation is not carried out. The configuration that the second interpolation frame I2 is generated using the motion vector MV2 obtained by scaling the motion vector MV1 provided with the first interpolation frame generator 14 is common with the second embodiment. However, the present embodiment differs from the second embodiment in a configuration using the motion vector MV2 for limiting an actual search range without using the motion vector MV2 as it is.

A process routine of the frame interpolation in the present embodiment will be described referring to FIGS. 14 and 15. A generation process of the first interpolation frame I1 from steps S301 to S303, an interpolation determination process from steps S304 and S305, and a display process from steps S308 to S310 in FIG. 15 are omitted from explanation because they are similar to the first embodiment. Only a generation process of the second interpolation frame I2 will be described hereinafter.

<Process of Interpolation Frame Generator 30>

Figure 15:
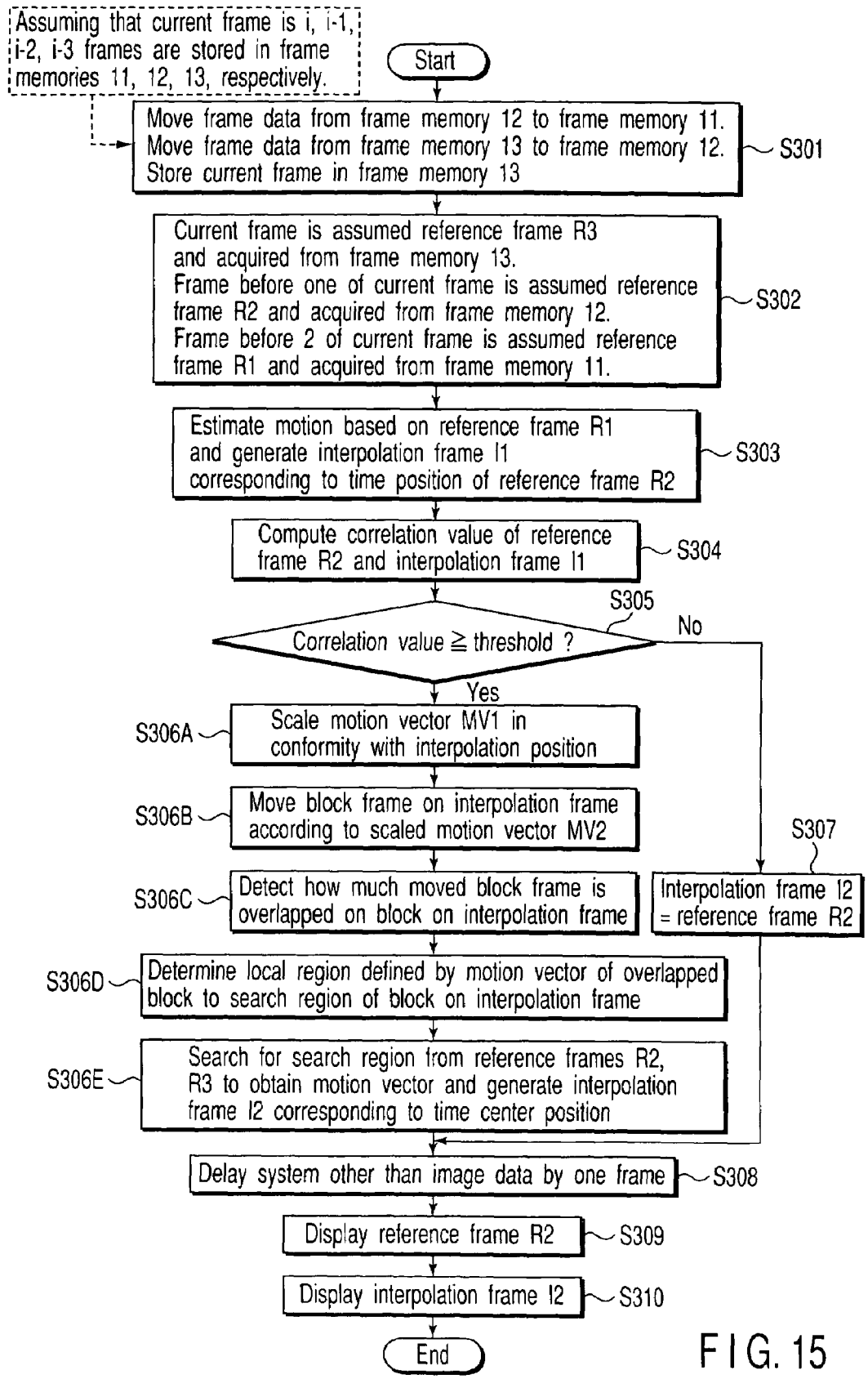
FIG. 15 is a flow chart of a process of a frame interpolation in the third embodiment.

In generating the second interpolation frame I2, when a correlation value between the reference frame R2 and the second interpolation frame I1 is not less than a threshold in step S305, that is, it is determined to carry out an interpolation, the first motion vector MV1 provided with the first interpolation frame generator 14 is scaled according to an interpolation position of the interpolation frame I2 to generate a second motion vector MV2, as shown in FIG. 15 (Step S306A).

The scaled second motion vector MV2 detects a region B2 overlapped on an object block on the interpolation frame I2. The third motion vector MV3 is derived by searching for a search region S defined by a motion vector passing through the overlap region B2. The interpolation frame I2 is generated by doing a motion compensation using the motion vector MV3 and the second and third reference frames R2 and R3. (Steps S306B–S306E). On the other hand, when the correlation value is less than the threshold, that is, it is determined that the interpolation is not done, in step S205, the second reference frame R2 is output as it is (step S307).

The generation process of the second interpolation frame I2 from steps S306A to S306E in the present embodiment comprises a vector scaling step S306A, an overlap detection step S306B–S306C, a motion estimation step S306D and a motion compensation step S306E. The process of steps S306A–S306E will be concretely described hereinafter.

<Vector Scaling Step>

The vector scaling step S306A scales the motion vector MV1 provided in generating the first interpolation frame, that is, reduces the length of the vector MV1 to obtain the second motion vector MV2. In this case, for the purpose of interposing the second interpolation frame I2 in a time center position between the second and third reference frames R2 and R3, the length of the first motion vector MV1 is reduced to ½ to generate the second motion vector MV2. Concretely, assuming that MV1=(Vx, Vy), MV2=(sVx, sVy) is calculated by sVx=½*Vx, sVy=½*Vy. In this case, the scaling is done with fixing the end of the vector.

<Overlap Detection Step>

Because the motion vector MV2 is a vector obtained by scaling the motion vector MV1 with fixing the end thereof, the block concerning the motion vector MV2 does not coincide with the block grating on the interpolation frame I2. Consequently, in the overlap search step S306B, it is detected how degree the block concerning the motion vector MV2 overlaps on the object block on the interpolation frame I2 with respect to what vector. In other words, the object block is moved on the second interpolation frame I2 according to the motion vector MV2 (step S306B). Subsequently, an actual search region S for the object block on the interpolation frame I2 is determined by the third motion vector MV3 concerning the overlapped block (step S306B). A search region S is assumed to include, for example, four pixels that are top and bottom and right and left with respect to the pixel position indicated by the motion vector MV3 is assumed.

<Motion Estimation Step>

In motion estimation step S306D, the fourth motion vector is estimated by being searched in geometrically symmetry with respect to the second and third reference frames R2 and R3 with the object block on the interpolation frame I2 being centered. The search region used here is the search region S defined by the motion vector MV3 detected in the overlap detection steps S306B and S306C.

<Motion Compensation Step>

In motion compensation step S306E, a motion compensation is carried out using the blocks on the second and third reference frames R2 and R3 that are defined by a motion vector estimated in the motion estimation step S306D to make the second interpolation frame I2. The present embodiment provides the same effect as the first and second embodiments. Further, it becomes possible to largely decrease a recalculating time by defining the actual search region S using the second motion vector MV2 found by the second interpolation frame generation step.

Fourth Embodiment

FIG. 16 shows an image display system concerning the fourth embodiment of the present invention. The configuration that the interpolation determination unit 25 processes in units of blocks is different from the above embodiments.

There will be described an embodiment similar to the first embodiment wherein an input image signal (video signal) is a non-interlaced signal of 60 Hz, an interpolation frame is generated in a time center position (interpolation frame position) between two reference frames adjacent with respect to the non-interlaced signal of 60 Hz, and a non-interlaced signal of 120 Hz is generated by interposing the interpolation frame between the two reference frames.

In the present embodiment similarly to the first embodiment, for the purpose of preventing an image quality of the whole video image from being deteriorated by interposing an interpolation frame of low quality, the quality of generated interpolation frame is inspected, and if it is determined that the quality is low, the interpolation is not carried out.

The first embodiment basically inspects quality of an interpolation frame using the whole screen. In contrast, in the fourth embodiment image degradation does not occur in the whole video image even if a part of a screen causes an image degradation continuously or locally over a plurality of frames. In the present embodiment, a region divided every block as shown at ② in FIG. 17 is inspected to detect continuous or local image deterioration. When it is determined by the inspection result that only a block causes continuously an image deterioration over a plurality of frames, it is determined that the interpolation frame is not interposed.

Figure 18:
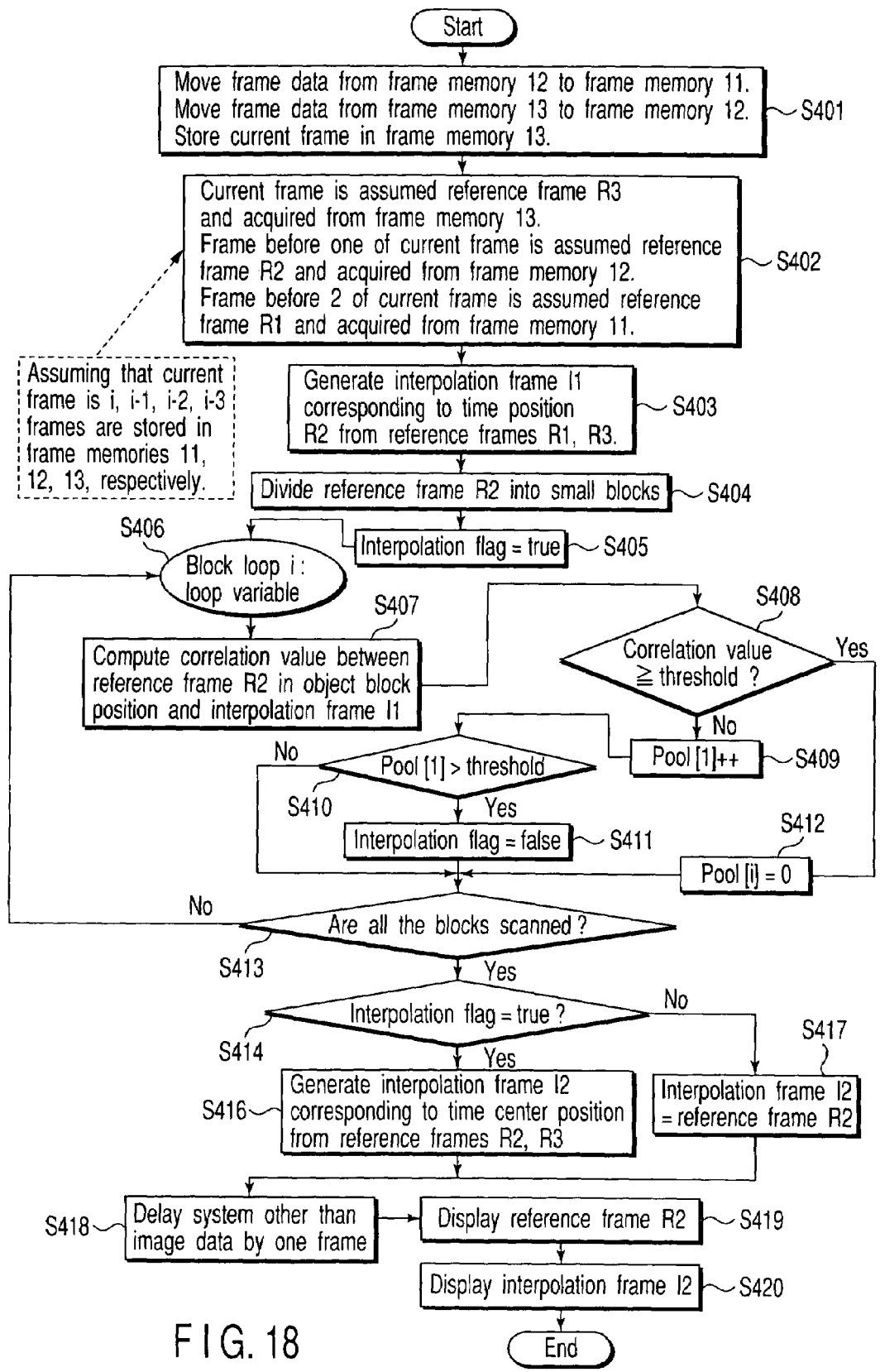
FIG. 18 is a flow chart of a process of a frame interpolation in the fourth embodiment.

A process routine of the frame interpolation in the present embodiment will be described referring to FIGS. 17 and 18. A generation process of the first interpolation frame I1 from steps S401 to S403, a generation process of the second interpolation frame I2 in steps S416 and S417, and a display process from steps S418 to S420 in FIG. 18 are omitted from explanation because they are similar to the above embodiments. Only an interpolation process from steps S403 to S414 will be described hereinafter.

As variable saving that an object block was low quality continuously over how many frames is prepared pool [i]. i is an index number of a block. The pool [i] is reset to all zero at the beginning of all processes, that is, before starting an interpolation process with inputting a video signal input.

<Interpolation Determination Step>

In the interpolation determination step, the interpolation frame I1 and the second reference frame are inspected every block. It is determined that the interpolation is not carried out when a block of low quality exists in a plurality of frames in succession. The evaluation value for inspection can use various methods similar to those described in the first embodiment. The block used here may be a block of size used in the interpolation frame generation step S403, and can select any other size. The interpolation determination step will be concretely described.

The second reference frame R2 is divided into a plurality of blocks (step S404). This block is a block of size used in the first interpolation frame generation step S403 or a block of any other size.

An interpolation flag is prepared as a determination flag indicating whether or not an interpolation is to be done. A true is given as an initial value (step S405). If the interpolation flag is true, it is determined that the interpolation is to be executed. If it is false, it is determined that the interpolation is not to be executed. The process after the interpolation decision step is a loop process in units of a block (step S406).

Quality of the interpolation frame I1 is inspected by comparing the second reference frame R2 in an object block position with the first interpolation frame I1 with respect to an i-th block. In other words, a correlation value between the reference frame R2 and the second interpolation frame I1 is computed (step S407). Whether or not the correlation value is not less than the threshold is examined (step S408).

When the correlation value is not less than the threshold, that is, the quality is better than the threshold, the process advances to step S412 and the pool variable is returned to zero (pool [i]=0). When the correlation value is less than the threshold, that is, the quality obtained according to the set evaluation value is worse than the threshold, the process advances to step S409, and 1 is added to the pool variable (pool [i]=pool [i]+1).

Whether or not an i-th block indicates low quality over the set number of frames is determined. Assuming that the set number of frames is a threshold 2, for example. The determination can be performed according to whether or not the pool variable is larger than the threshold 2. In other words, it is determined whether or not pool [i]>threshold 2 (step S410). If the pool [i]>threshold 2, the quality of the block is low continuously, so that the interpolation is not executed. In other words, A "false" is inserted in the interpolation flag (step S411). Otherwise, since the interpolation is carried out, the interpolation flag is maintained to the "true" set in step S405.

The steps S406 to S412 are carried out repeatedly until it is determined that the process is finished for all blocks, and then the interpolation determination finishes. As thus described, in the present embodiment, it is possible to realize the frame interpolation which can cope with local image degradation by doing the interpolation determination every block.

Fifth Embodiment

Figure 19:
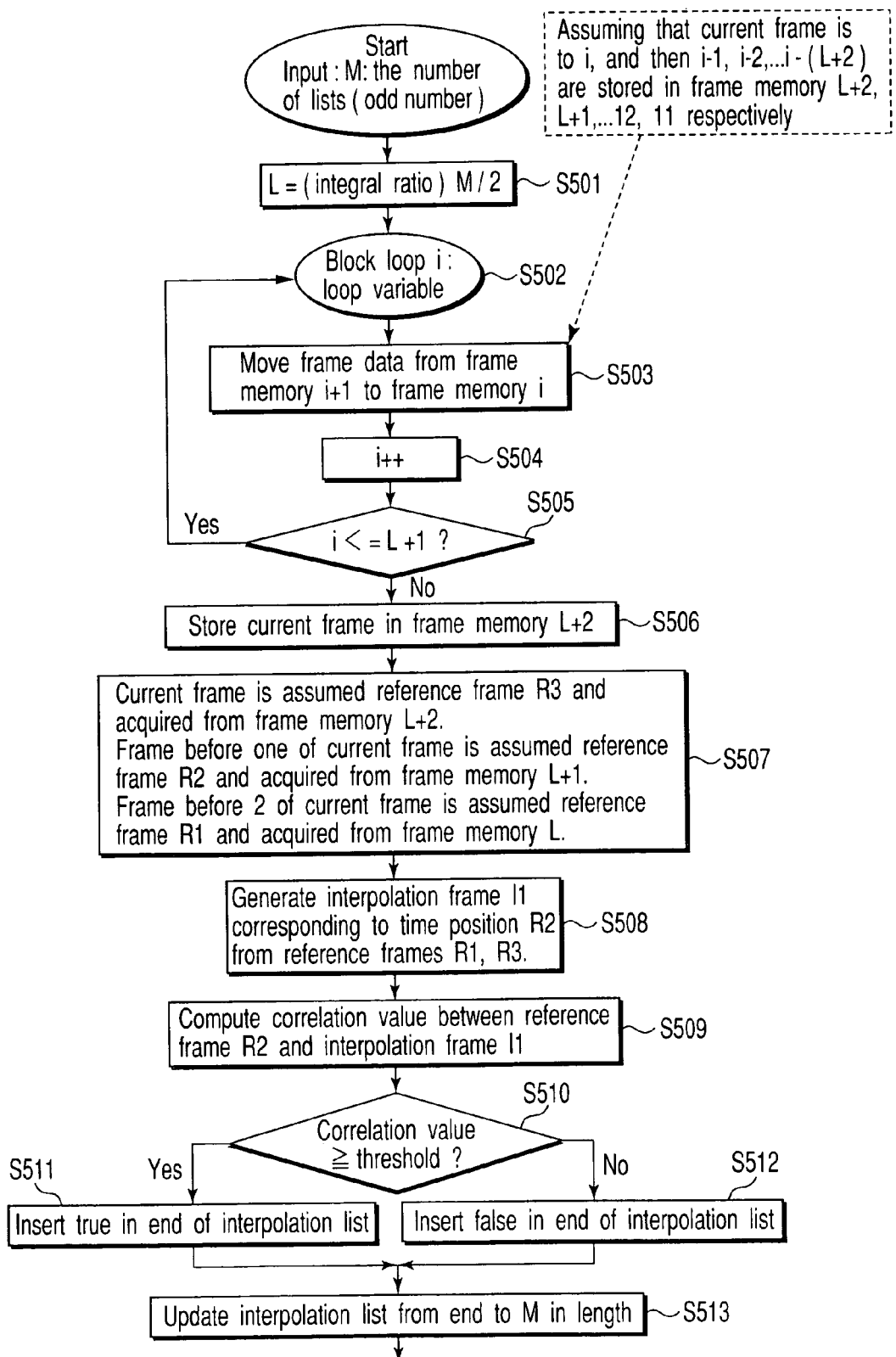
FIG. 19 is a flow chart of a process of a frame interpolation in the fifth embodiment of the present invention.
Figure 20:
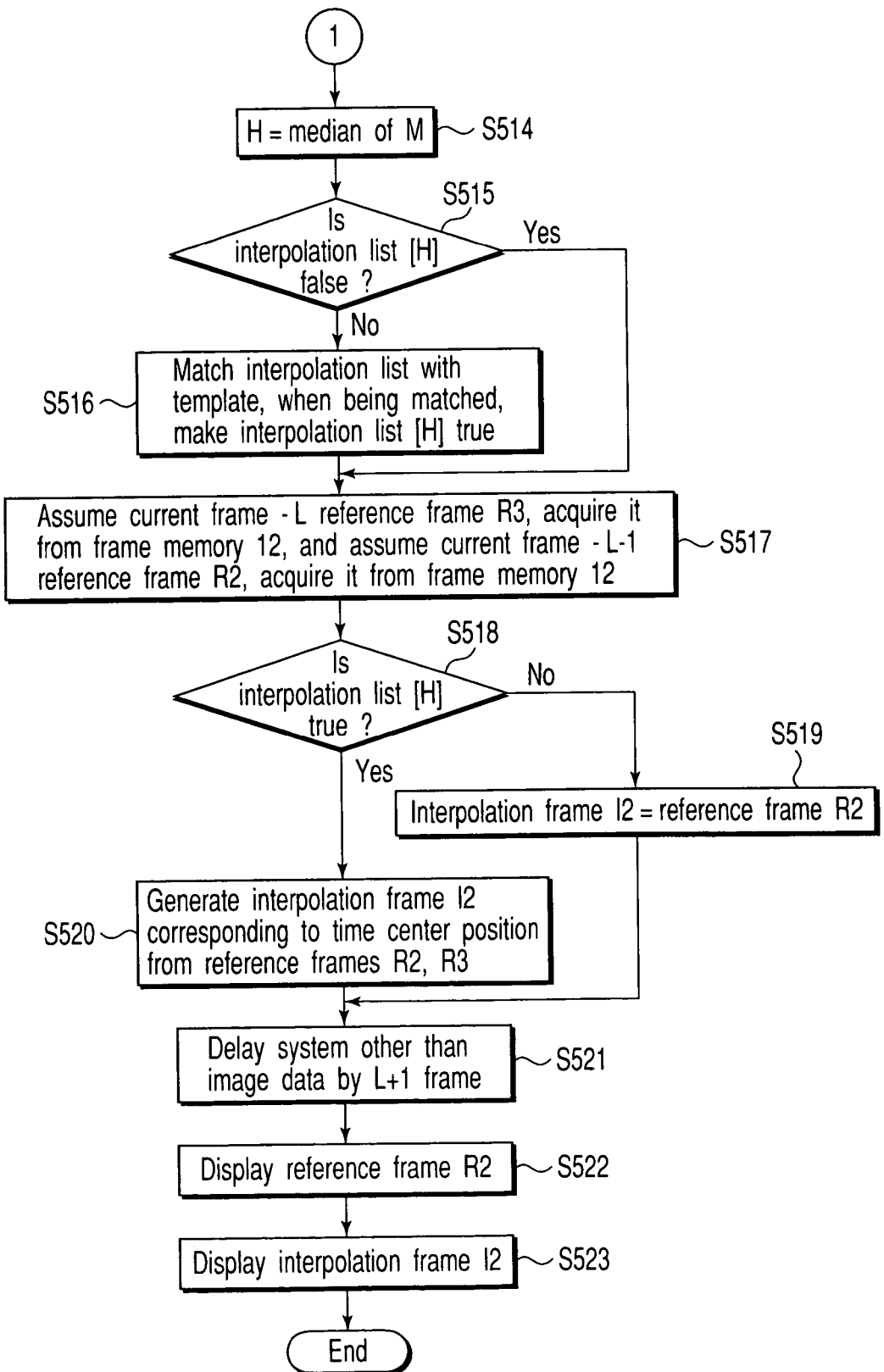
FIG. 20 is a flow chart of a process of a frame interpolation in the fifth embodiment.

The fifth embodiment of the present invention will be described referring to a flow chart shown in FIGS. 19 to 20. An image display system in the present embodiment may be similar to a configuration shown in FIG. 1 as used in, for example, the first embodiment.

There will be described an embodiment similarly to the above embodiments wherein an input image signal (video signal) is a non-interlaced signal of 60 Hz, an interpolation frame is generated in a time center position (interpolation frame position) between two reference frames adjacent with respect to the non-interlaced signal of 60 Hz, and a non-interlaced signal of 120 Hz is generated by interposing the interpolation frame between the two reference frames.

In the present embodiment similarly to the first embodiment, for the purpose of preventing an image quality of the whole video image from being deteriorated by interposing an interpolation frame of low quality, the quality of generated interpolation frame is inspected, and if it is determined that the quality is low, the interpolation is not carried out.

In the fourth embodiment, when a local error occurs in terms of time and space, it is determined the interpolation is not done to keep quality of the whole video image. In this case, if no errors occurred before and after an error occurred momentarily, motion of a moving image is not smooth for an instant when an interpolation is not carried out. Such disorder of the motion is very high in visibility, and may give uncomfortable feeling to a viewer. Consequently, in the present embodiment, there is provided a process to compensate a determination result in an interpolation position in view of a determination result before and after occurrence of an momentary error, whereby the uncomfortable feeling due to continuity of time is alleviated.

A process routine of a frame interpolation in the present embodiment will be described referring to FIGS. 19 and 20. A generation process of the first interpolation frame I1 in step S506, a generation process of the second interpolation frame I2 in steps S519 and S520, and a display process from steps S521 to S523 in FIGS. 19 and 20 are omitted from explanation because they are similar to the first embodiments. An interpolation determination process will be described hereinafter.

<Operation of a Frame Memory>

An image signal 10 which is a video signal is input in units of a frame as time continuous frame data sequentially. As shown in FIG. 4, assuming that the frame data input at a certain moment is i frame. In this time, assuming that (i-1)-th, (i-2)-th, (i-(L+1))-th, . . . , -(L+2)-th frames are stored frame memories L+2, L+1, . . . , 12, 11 respectively (0-th state in L=0). When an i-th frame is input, the frame data in the frame memories L+2, L+1, . . . , 12, 11 are transferred as follows:

(1) Transfer the frame data in the frame memory 12 to the frame memory 11;

(2) A Transfer the frame data in frame memory 13 to the frame memory 12;

(3) Store the input frame data of i frame to the frame memory 13.

In this way, the frame data of (i-L+2)-th, (i-L+1)-th, (i-2)-th, (i-1)-th, i-th frames are stored in the frame memories 11, 12, . . . , L, L+11, L+2, respectively.

In convenience, the frame data in the frame memory L is defined as the first reference frame R1, the data in the frame memory L+1 is defined as the second reference frame R2, and the third data in frame memory L+2 are defined as the third reference frame R3. To access the frame data of the frame memories L, L+1 and L+2 is to access the frame data of the reference frames R1, R2 and R3. The above process corresponds to steps S501 to S507 of FIG. 19.

<Interpolation Determination Step>

The interpolation determination step compares the first interpolation frame I2 generated in step S510 with the second reference frame R2 to inspect quality of the interpolation frame I1, and determines whether or not the interpolation is to be done according to an inspection result. In other words, a correlation value expressing a level of correlation between the reference frame R2 and the interpolation frame I2 is computed (step S509). If the correlation value is not less than the threshold, quality of the interpolation frame I1 is determined to be high. If it is less than the threshold, the quality is determined to be low (step S510). According to the determination result, the second interpolation frame I2 is generated as follows.

When the correlation value is determined to be not less than the threshold in step S510, "true" is interposed in the end of an interpolation list stored in, for example, a memory provided in the interpolation determination unit 15 (step S511). When the correlation value is determined to be less than the threshold, "false" is interposed in the end of the interpolation list (step S512). Thereafter, the length of the interpolation list is updated from the end to M (step S513). When the median of M is assumed H, it is checked whether or not the interpolation list [H] is "false" (steps S514 and S515). If [H] is "false", template matching is done with respect to the interpolation list [H]. When matching is carried out, the interpolation list [H] is set to "true" (step S516), and the process advances to step S517. If [H] is not "false", the process advances to step S517.

In step S517, a current frame L is acquired from the reference frame I2 as the third reference frame R3. Further, a frame L-1 is acquired from the frame memory 11 as the second reference frame R2. It is examined whether or not the interpolation list [H] is "true" to determine whether an interpolation is to be done (step S518). Similarly to the first embodiment, when the interpolation is determined, the second interpolation frame I2 corresponding to a time center position between the second and third reference frames R2 and R3 is generated (step S520). When it is determined that the interpolation is not done, the second reference frame R2 is output as it is (step S519).

In performing a display process, the output timing of a system other than the image display system is delayed by a (L+1) frame of the video signal (step S521). The second reference frame R2 is displayed in sync with a display timing of in image (step S522). Further, the second interpolation frame I2 is displayed (step S523).

Sixth Embodiment

Figure 22:
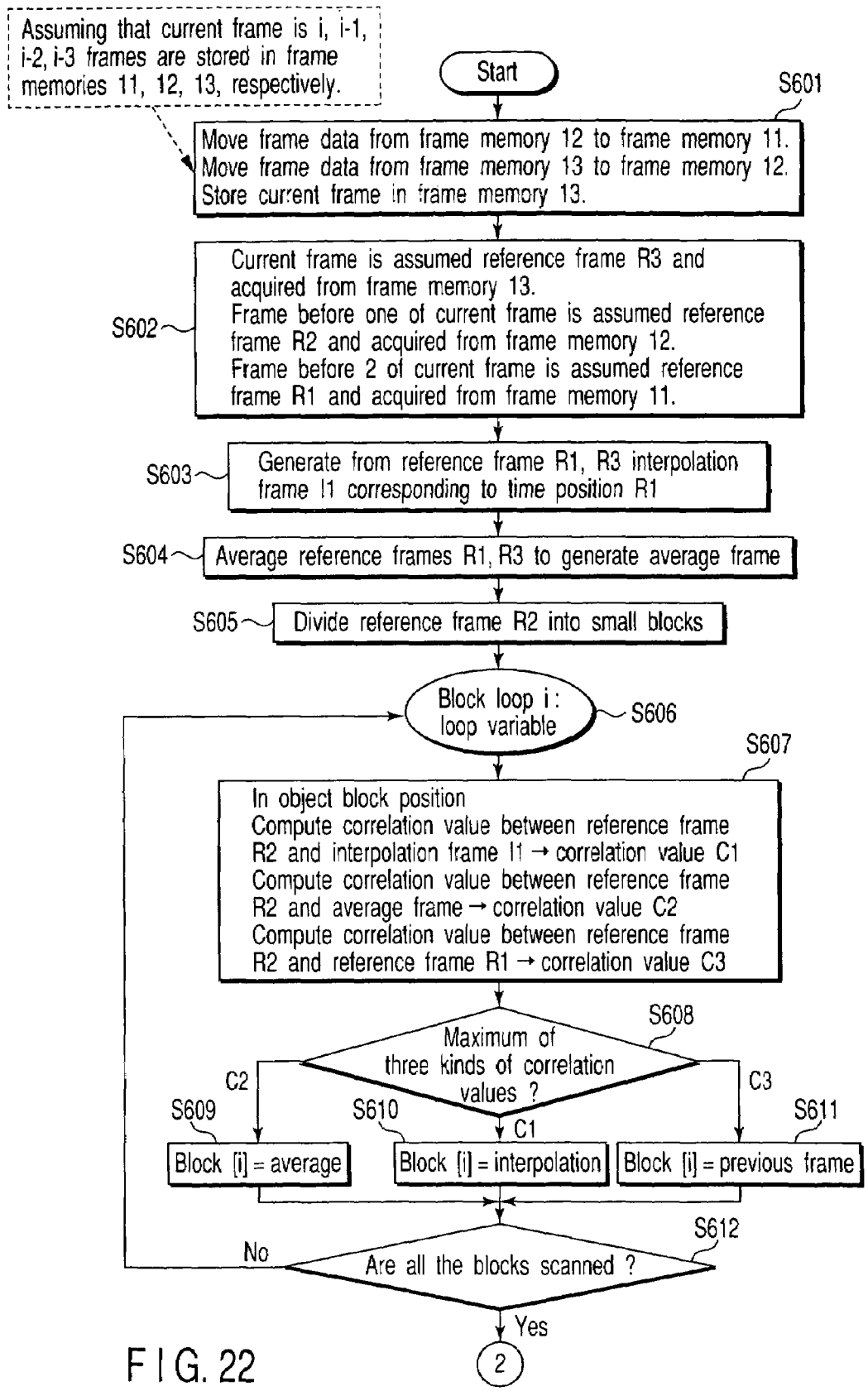
FIG. 22 is a flow chart of a process of a frame interpolation in the sixth embodiment.
Figure 23:
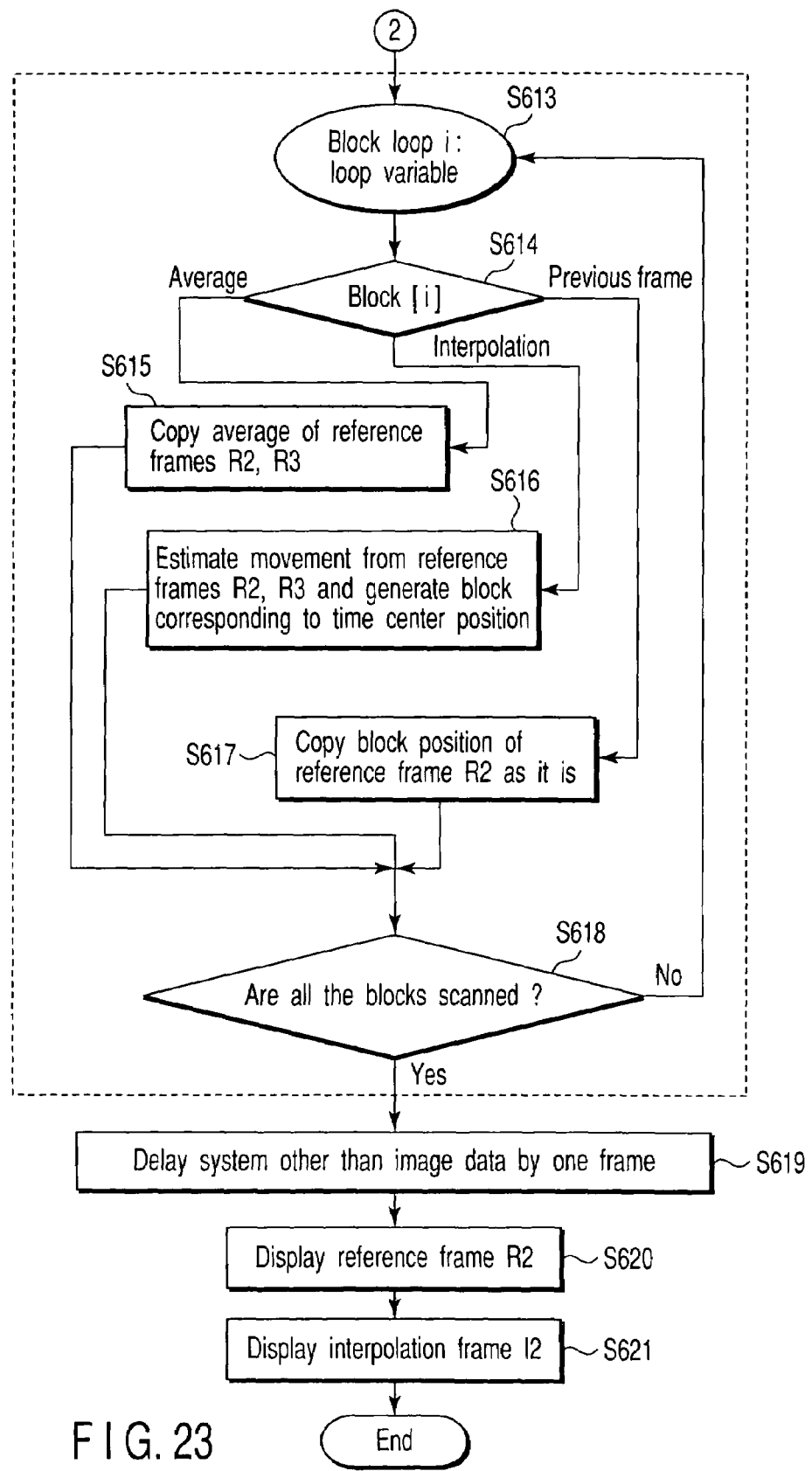
FIG. 23 is a flow chart of a process of a frame interpolation in the sixth embodiment.

The sixth embodiment of the present invention will be described using FIGS. 21 to 23. The configuration of image display system in the present embodiment is similar to that shown in FIG. 1, for example.

There will be described an embodiment wherein an input image signal (video signal) is a non-interlaced signal of 60 Hz, an interpolation frame is generated in a time center position (interpolation frame position) between two reference frames adjacent with respect to the non-interlaced signal of 60 Hz, and a non-interlaced signal of 120 Hz is generated by interposing the interpolation frame between the two reference frames, similarly to the above embodiments.

A method of generating an interpolation frame may select various methods as described in the first embodiment. However, the various methods have good points and bad points. An interpolation frame generation method without using a motion vector, that is, a method of using a previous frame as an interpolation frame or a method of using an average of forward and backward frames provides a high precision for a still region.

An interpolation frame generation method using a motion vector provides a high precision for a motion region. An interpolation frame generation method of a region division type may provide a high precision for a motion region divided into a plurality of motion parts. In the case of this method, it is preferable for obtaining a high effect that a region of uniform motion is not divided. As described above, an optimum interpolation frame generation method differs every segment.

In the present embodiment, an interpolation determination step is provided for permitting to select an optimum interpolation frame generation method every block. As shown at (2) in FIG. 21, the interpolation blocks B11, B12 and B13 generated by a plurality of interpolation frame generation methods every block is compared with an original block B10 according to an interpolation determination. An interpolation frame generation method indicating a maximum evaluation value is estimated to be optimum even in an actual interpolation frame position.

Figure 21:
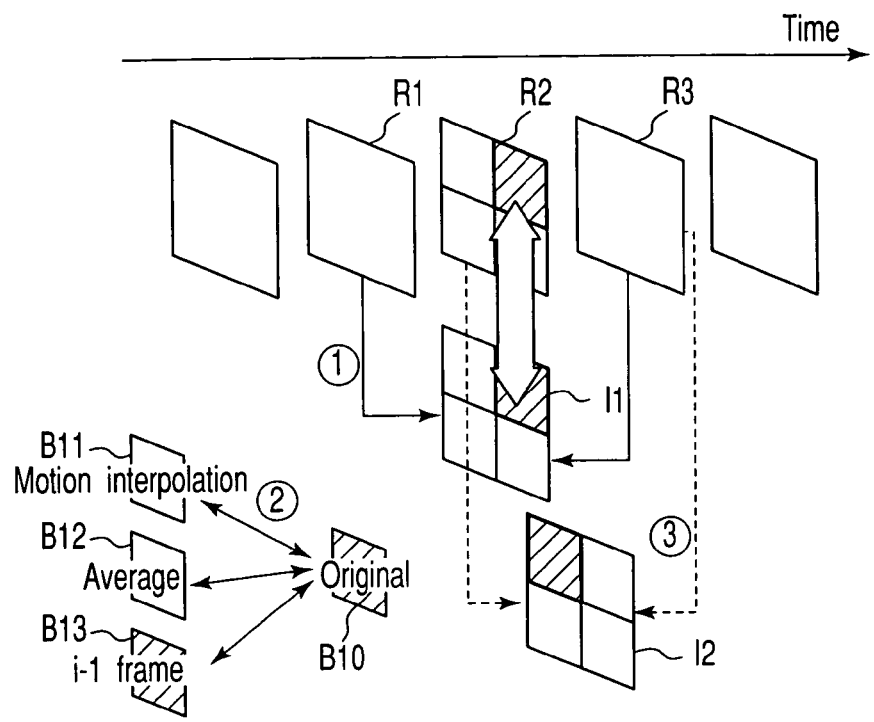
FIG. 21 is a conceptual diagram of a frame interpolation in the sixth embodiment of the present invention.

As shown in (3) of FIG. 21, the method is actually applied as an interpolation frame generation method used for generating an interpolation frame of the block.

The present embodiment employs three interpolation frame generation methods described in the first embodiment, a method of averaging adjacent forward and backward frames and a method of using a previous frame as it is. Blocks B11, B12 and B13 of FIG. 21 show interpolation blocks generated by these generation methods. An interpolation frame generation method used in the present embodiment is not limited to these in particular. The method may be selected from, for example, three interpolation frame generation methods described in the first embodiment. Combination of three interpolation frame generation methods, an average frame and a previous frame may be applied.

<First Interpolation Frame Generation Step>

The process including steps S601 and S602 in generating the first interpolation frame I1 is similar to the first embodiment. After step S602, a motion vector is computed from the first and third reference frames R1 and R3, and the interpolation frame I1 corresponding to a time position of the second reference frame R2 is generated (step S603). A method of generating the interpolation frame I1 is not limited in particular, and may be selected from the various interpolation frame generation methods shown in, for example, the first embodiment. For example, image data of the first and third reference frames R1 and R3 may be subjected to linear average to obtain an average frame, and the first reference frame R1 may be adopted as a previous frame.

<Interpolation Determination Step>

An optimum interpolation frame generation method is selected every in this embodiment. The process of an interpolation determination step is a loop process done every block (step S606). With the i-th block (i is an index of a block), the quality of the second reference frame R2 and interpolation frame I1 in an interpolation block position, an average frame, and a previous frame is inspected (steps S604 to S608). The reference frames R1 and R3 are averaged to generate an average frame (step S604). The reference frame R2 is divided into a plurality of small blocks (step S605).

In the interpolation block position, a correlation value C1 between the reference frame R2 and the interpolation frame I1, a correlation value C2 between the reference frame R2 and the average frame generated in step S604, and a correlation value C3 between the reference frame R2 and the reference frame R1 are computed (step S607). The maximum one of these correlation values C1, C2 and C3 is selected (step S608). If C2 is maximum, the average frame is used for generating the second interpolation frame I2. If C1 is maximum, the interpolation frame I1 is used. If C3 is maximum, the previous frame is used (steps S609, S610, S611).

The steps S606 to S611 are repeated till it is determined in step S612 that they have been done for all the blocks, and the interpolation determination finishes.

<Second Interpolation Frame Generation Step>

An interpolation frame to be interposed between the second and third reference frames R2 and R3 is generated using an interpolation frame generation method selected by the interpolation determination step. The process for generating the second interpolation frame is a loop process carried out every block (step S613). With the i-th block (i is an index of a block), an interpolation determination result in an interpolation block position is read (step S614), and the following process is carried out according to the result.

At first, when the interpolation determination result is the average frame, an average of the blocks of the second and third reference frames is copied to an interpolation frame (step S615). When the interpolation determination result is the interpolation frame I1, an interpolation block corresponding to a time center position between the second and third reference frames R2 and R3 in the block position of the interpolation frame I1 is generated using a motion vector between the frames R2 and R3, similarly to the first embodiment. The interpolation block is copied to the interpolation frame (step S616). Otherwise, an interpolation block may be derived by diverting the motion vector of the block position found by the first interpolation frame generation step without deriving a motion vector newly, as the second embodiment. Alternatively, the interpolation block may be derived as described in the third embodiment. When the interpolation determination result is the previous frame, the block in the block position of the second reference frame is copied to the interpolation frame (step S617). The above steps are repeated for all blocks to generate the interpolation frame I2. In addition, when the maximum of the correlation values C1, C2 and C3 is compared with the threshold and the maximum does not reach the threshold, the second reference frame R2 may be used as the interpolation frame.

In the present embodiment as described above, the interpolation blocks generated by a plurality of interpolation frame generation methods are compared with an original block every block in the interpolation determination step. It is estimated that the interpolation frame generation method that the correlation value becomes maximum is most suitable even in an actual interpolation frame position. It is adopted as an interpolation frame generation method for generating the actual interpolation frame. As a result, it becomes possible to select an optimum interpolation frame generation method every block.

Seventh Embodiment

There will be described the seventh embodiment of the present invention hereinafter. The present embodiment permits the precision of quality inspection with respect to the interpolation frame to improve and an high precision interpolation to realize, even if the time interval between the frames of an input video signal is long.

Figure 24:
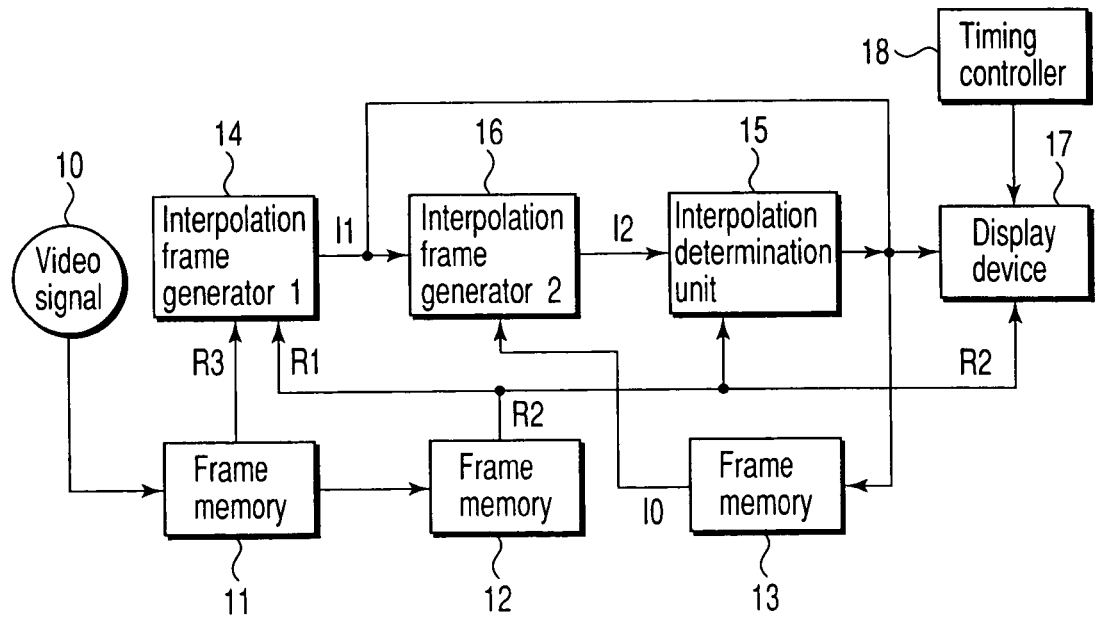
FIG. 24 is a block diagram of an image display system concerning the seventh embodiment of the present invention.

FIG. 24 shows a configuration of an image display system according to the seventh embodiment of the present invention. First and second interpolation frame generators 14 and 16 are connected in cascade. The first interpolation frame generator 14 generates the first interpolation frame I1 from the reference frames R2 and R3.

The second interpolation frame generator 16 generates the second interpolation frame I2 from the first and third interpolation frames I1 and I2. An interpolation determination unit 15 determines interpolation for inspecting quality of the first interpolation frame I1 from the reference frame R2 and the interpolation frame I2.

There will be described an embodiment wherein an input image signal (video signal) is a non-interlaced signal of 30 Hz, an interpolation frame is generated in a time center position (interpolation frame position) between two reference frames adjacent with respect to the non-interlaced signal of 30 Hz, and a non-interlaced signal of 60 Hz is generated by interposing the interpolation frame between the two reference frames.

In the first embodiment, a frame interpolation between two reference frame R1 and R3 interposing the reference frame R1 therebetween to inspect quality of the first interpolation frame I1. When the input video signal is 30 Hz and a time interval between adjacent frames is long (1/30 Hz in this example) as the seventh embodiment, the time interval between the reference frames R1 and R3 becomes long, too (2/30 Hz in this example). Therefore, if the quality of interpolation frame I1 is inspected by frame interpolation between the reference frame R1 and R3 as the first embodiment, the interpolation precision falls down. Alternatively, a search region must be extended to maintain the interpolation precision.

Figure 25:
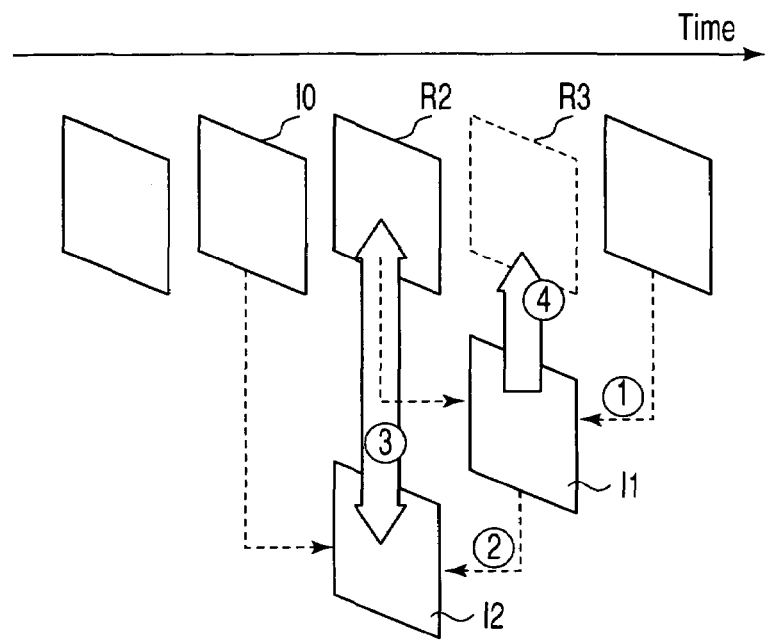
FIG. 25 is a conceptual diagram of a frame interpolation in the seventh embodiment.

Consequently, in the present embodiment, interpolation frame for quality inspection is generated in frame interpolation of two interpolation frames sandwiching one reference frame. Concretely, the following processes are done as shown in FIG. 25.

(1) Interpolation frame I1 (first interpolation frame) corresponding to a time center position between the second and third reference frames R2 and R3 is generated based the second and third reference frames R2 and R3.

(2) Interpolation frame I2 (third interpolation frame) corresponding to a time position of the second reference frame R2 is generated based on the interpolation frame I1 and the interpolation frame I0 (second interpolation frame) which is interposed before one frame.

(3) Quality of the interpolation frame I2 is inspected by comparing the second interpolation frame I2 with the reference frame R2.

(4) If quality is higher than a provision, that is, a correlation value is not less than the threshold, the interpolation frame I1 is interposed between the second and third reference frames R2 and R3.

As a result, it is possible to inspect the quality of the interpolation frame based on two frames I2 and I0 between which a time interval is short (in this case, the time interval is 1/30 Hz). Since the interpolation frame I2 is generated by frame interpolation between the interpolation frames I2 and I0, quality of the interpolation frame I2 is less than good. However, the interpolation frame I2 is for inspection first and foremost. Therefore, the quality of the interpolation frame I2 do not interfere for verification of quality, if the evaluation value for quality inspection is shifted from the interpolation frame by a value required for generating the interpolation frame. Because a frame to be actually interpolated is the interpolation frame I1 generated by the original second and third reference frame R2 and R3, the interpolated frame I1 is not contaminated with an error occurring by making an interpolation frame from an interpolation frame.

Figure 26:
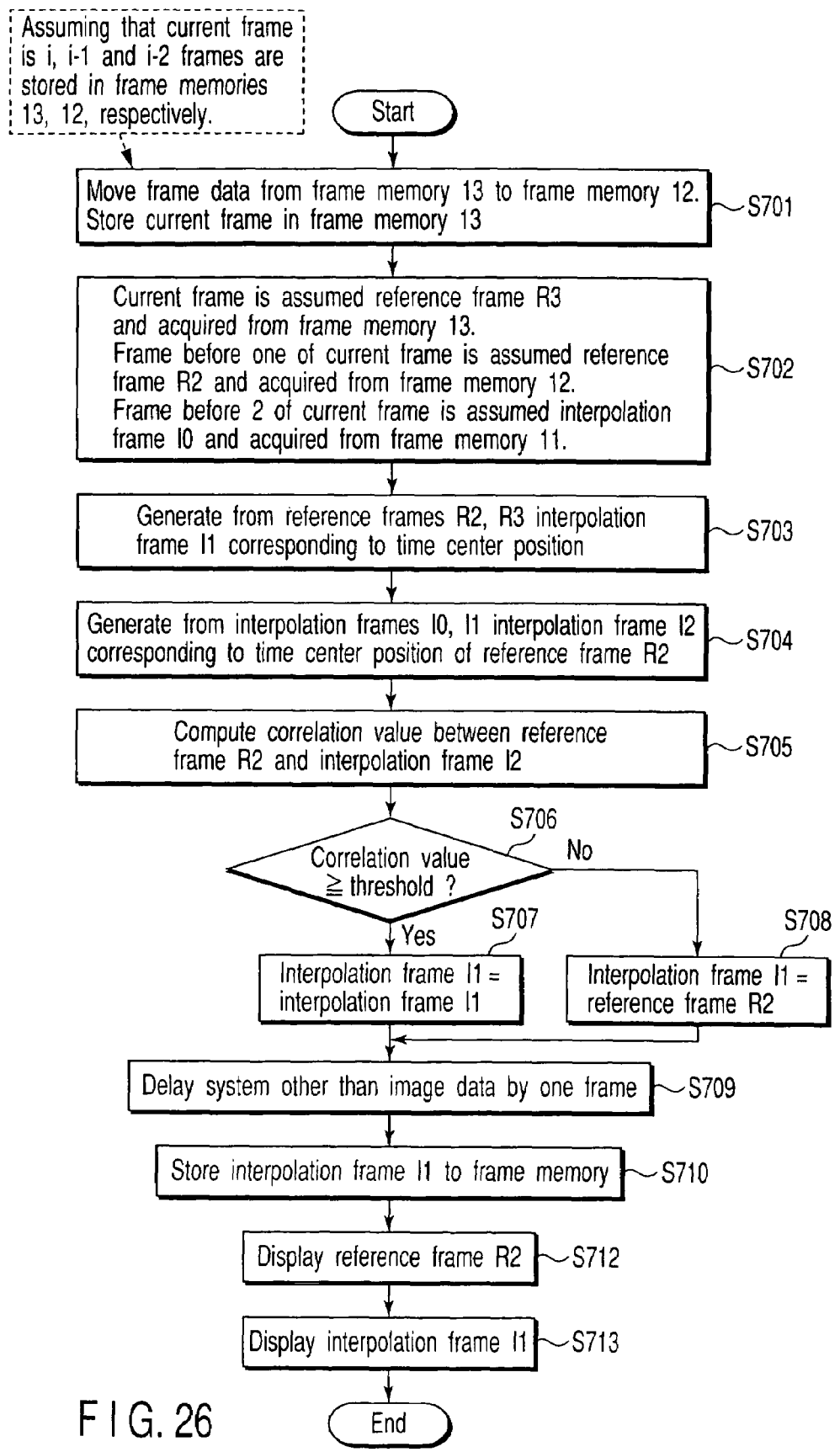
FIG. 26 is a flow chart of a process of a frame interpolation in the seventh embodiment.
Figure 28:
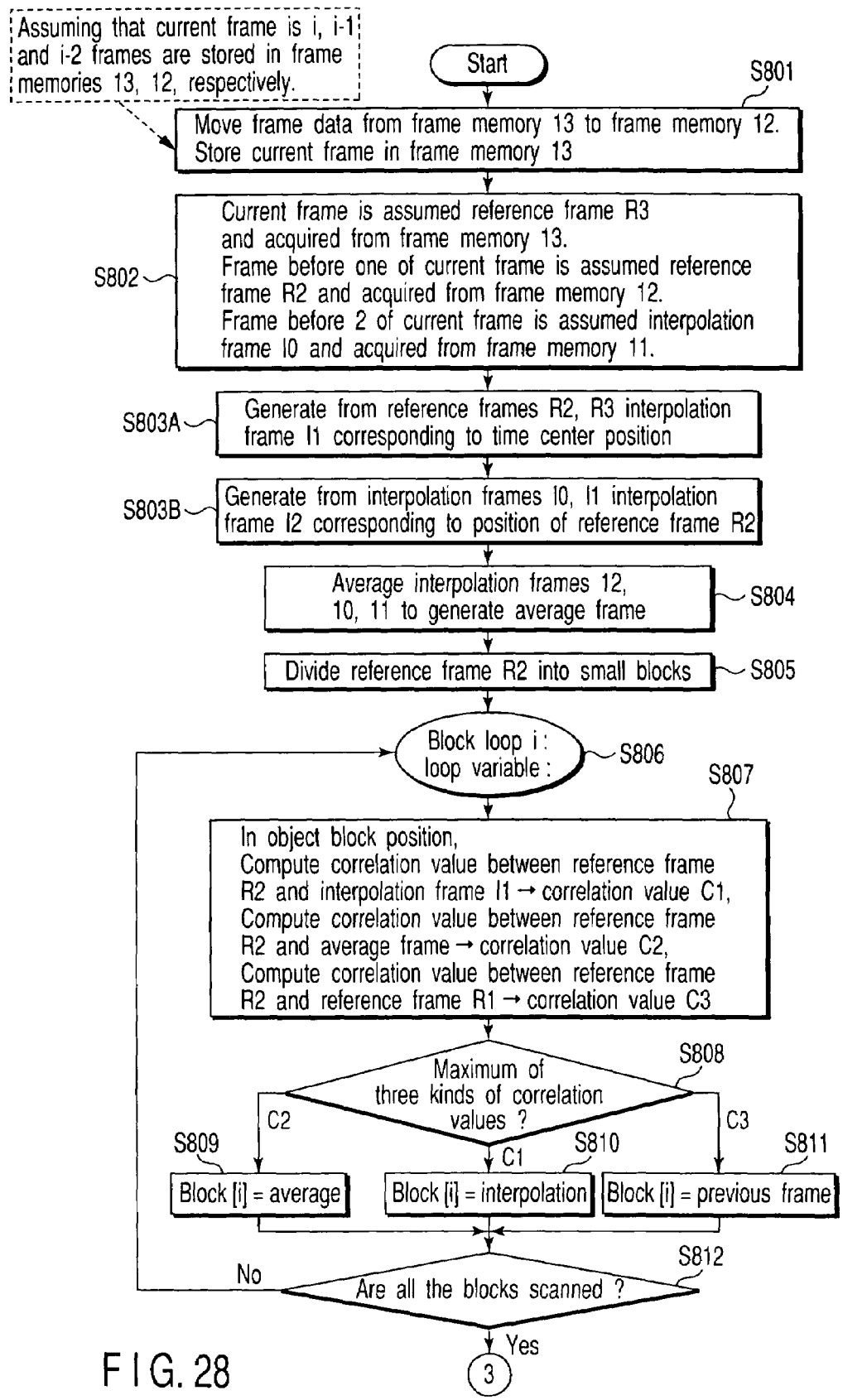
FIG. 28 is a flow chart of a process of a frame interpolation in the eighth embodiment.

The frame interpolation in the present embodiment will be described referring to FIGS. 25 and 26. A video signal 10 is input in units of a frame, that is, in a form of time continuous frame data sequentially. The frame data that is input at a certain moment assumes to be i frame. In this time, it is assumed that data of i-2 and i-1 frames is stored in the frame memories 12 and 13 based on past accumulation (step S701).

In this state, a currently input video signal (current frame) is derived from the frame memory 13 as the reference frame R3. A frame before one frame than the current frame is derived from the frame memory 12 as the reference frame R2. An interpolation frame before two frames than the current frame is derived from the frame memory 11 as the interpolation frame I0 (step S702). The first interpolation frame I1 corresponding to a time center position between the reference frames R2 and R3 is generated (step S703). The interpolation frame I2 corresponding to a time center position of the reference frame R2 is generated from the interpolation frames I0 and I1 (step S704).

A correlation value expressing a level of correlation between the interpolation frame I2 and the second reference frame R2 is computed to inspect quality of the interpolation frame I2 (step S705). The correlation value is compared with the threshold (step S706). If the correlation value is not less than threshold, that is, if the quality is more than a provision, an interpolation frame I1 is interposed between the second and third reference frames R2 and R3 (step S707). If the correlation value does not reach the threshold, that is, if the quality of interpolation frame I1 is low, the reference frame R2 is interposed between the second and third reference frames R2 and R3 as it is (step S708). The display process from steps S709 to S713 is omitted in explanation, since it is same as the first embodiment.

In the present embodiment as described above, even if the input video signal to be a non-interlace signal of 30 Hz, that is, the video signal that a time interval between frames is long is subjected to a frame interpolation, a high interpolation precision can be obtained by inspecting the quality of interpolation frame with high precision.

Eighth Embodiment

There will be explained the eight embodiment of the present invention. The present embodiment is a combination ob the sixth and seventh embodiment. The image display system in the present embodiment is similar to the seventh embodiment, and is shown in FIG. 24. There will be described an embodiment wherein an input image signal (video signal) is a non-interlaced signal of 30 Hz, an interpolation frame is generated in a time center position (interpolation frame position) between two reference frames adjacent with respect to the non-interlaced signal of 30 Hz, and a non-interlaced signal of 60 Hz is generated by interposing the interpolation frame between the two reference frames, like the seventh embodiment.

In the present embodiment, there is described an example to select an interpolation frame generation method every block similarly to the sixth embodiment. In the case of that the input video signal is 30 Hz and a time interval between adjacent frames is long as the seventh embodiment, when the quality of interpolation frame I1 is inspected by frame interpolation between the reference frame R1 and R3, the interpolation precision falls down. Alternatively, a search region must be extended to maintain the interpolation precision.

Figure 27:
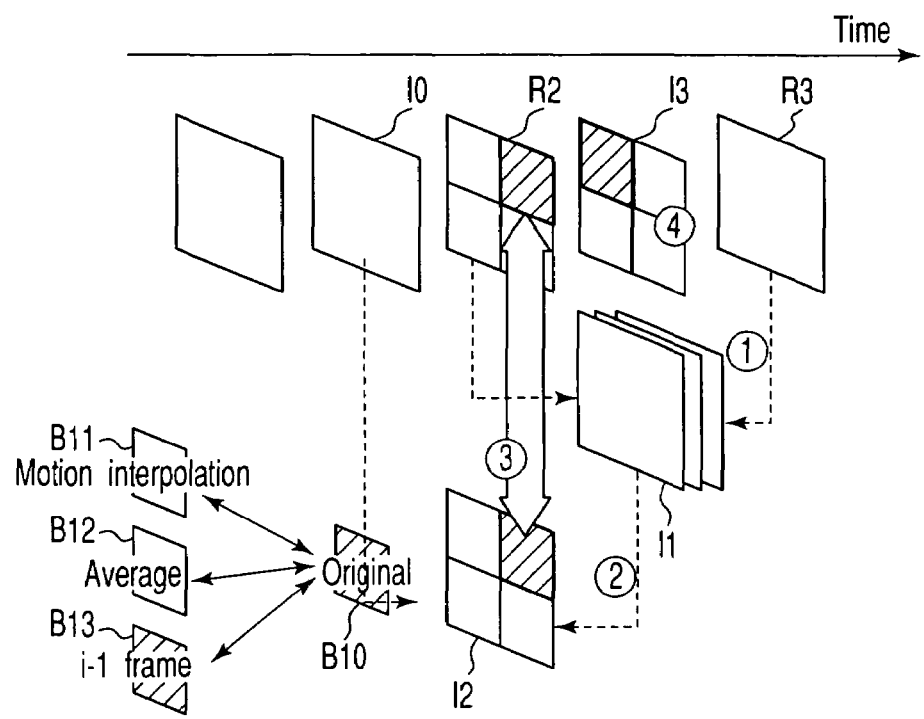
FIG. 27 is a conceptual diagram of a frame interpolation in the eighth embodiment of the present invention.

In the present embodiment, an interpolation frame for inspection is generated without separating the time interval from 30 Hz by making the interpolation frame I2 for quality inspection from the interpolation frames I1 and I0, like the seventh embodiment. Concretely, the interpolation frame is generated as shown in FIG. 27.

(1) Interpolation framed I1 corresponding to a time center position between the second and third reference frames R2 and R3 are generated by a plurality of interpolation frame generation methods.

(2) Interpolation frames I2 corresponding to a time position of the second reference frame R2 are generated by a plurality of interpolation frame generation methods from the interpolation frame I1 and the interpolation frame I0 (interpolation frame interposed before one frame).

(3) Quality is inspected by comparing the block of the interpolation frame I2 with an original block according to interpolation determination. The interpolation frame generation method that the evaluation value becomes maximum is estimated to be optimum even in an actual interpolation frame position.

(4) The estimated interpolation frame generation method is adopted as an interpolation frame generation method to be actually used for generating an interpolation frame of the block. In other words, the interpolation frame I3 is generated by synthesizing the interpolation frames I1.

Since the interpolation frame I2 is generated by frame interpolation between the interpolation frames I2 and I0, quality of the interpolation frame I2 is less than good. However, the interpolation frame I2 is for inspection first and foremost. Therefore, the quality of the interpolation frame I2 do not interfere for verification of quality, if the evaluation value for quality inspection is shifted from the interpolation frame by a value required for generating the interpolation frame. Because a frame to be actually interpolated is the interpolation frame I1 generated by the original second and third reference frame R2 and R3, the interpolated frame I1 is not contaminated with an error occurring by making an interpolation frame from an interpolation frame.

In the present embodiment, as an interpolation frame generation method are employed a method of averaging forward and backward adjacent frames, a method of using a previous frame as it is, and three interpolation frame generation methods described in the first embodiment, similarly to the sixth embodiment. The interpolation frame generation method is not limited to these methods in particular. It may be selected from three interpolation frame generation methods described in the first embodiment. The three interpolation frame generation methods and a method using the average frame and the previous frame may be adopted.

Figure 29:
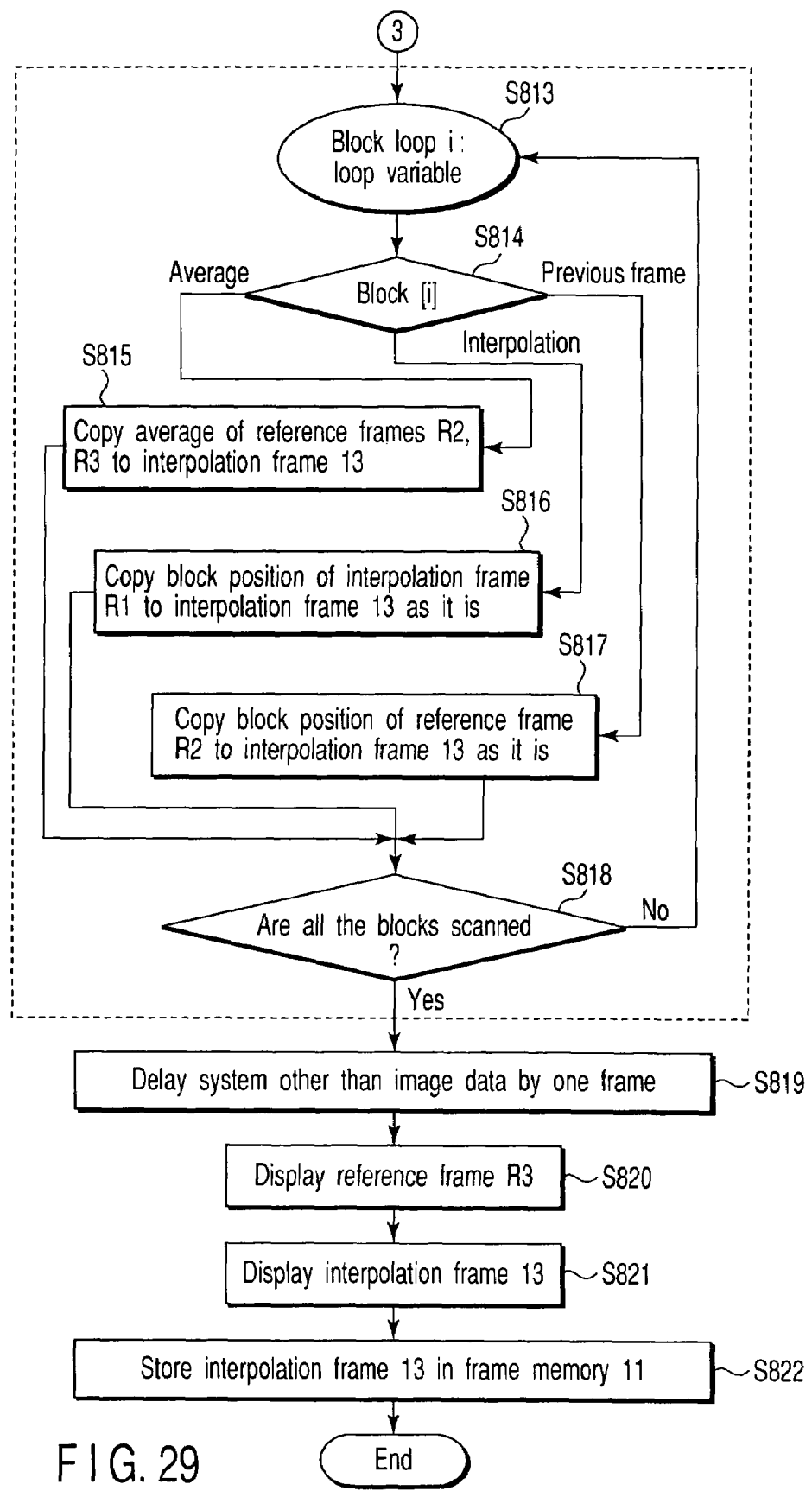
FIG. 29 is a flow chart of a process of a frame interpolation in the eighth embodiment.

FIGS. 29 and 30 show a process routine of a concrete frame interpolation in the present embodiment. The process routine of the present embodiment is a combination of the process routine of the sixth embodiment shown in FIGS. 22 and 23 and the process routine of the seventh embodiment shown in FIG. 26. As discussed above, according to the present invention, it is possible to generate an interpolation frame of high quality and carry out frame interpolation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of generating an interpolated image, comprising:
    inputting a video signal including a first reference image, a second reference image and a third reference image that continue in terms of time
    generating a first interpolation image put in a position of the second reference image, using the first reference image and the third reference image;
    computing a correlation value between the second reference image and the first interpolation image;
    generating a second interpolation image put in an interpolation position between the second reference image and the third reference image; and
    interposing the second interpolation image in the interpolation position when the correlation value is not less than a threshold.

2. The method according to claim 1, wherein the computing computes the correlation value based on at least one of a differential value between images of a luminance component, a differential value between images of a color difference component, a differential value between images of a luminance component and a color difference component, a multiplication value between images of a luminance component, a division value between images of a luminance component, a multiplication value between images of a color difference component, a division value between images of a color difference component, a multiplication value between images of a luminance component and a color difference component, and a division value of a luminance component and a color difference component.

3. The method according to claim 1, wherein generating the first interpolation image includes generating the first interpolation image by at least one of (a) a manner of generating the first interpolation image by means of a motion vector between the first reference image and the third reference image, (b) a manner of generating the first interpolation image by obtaining an average of the first reference image and the third reference images according to distances of the first reference image and the third reference image with respect to the second reference image, and (c) a manner of determining the first reference image to the first interpolation image.

4. The method according to claim 1, wherein generating the second interpolation image includes generating the second interpolation image using a motion vector between the second reference image and the third reference image.

5. The method according to claim 1, wherein generating the second interpolation image includes generating the second interpolation image by calculating an average of the second reference image and the third reference image according to distances of the second reference image and the third reference image with respect to the interpolation position.

6. The method according to claim 1, wherein the computing includes computing the correlation value in units of a plurality of blocks obtained by dividing each of two images used for correlation computation.

7. The method according to claim 1, wherein the interposing includes interposing the second interpolation image in units of a plurality of blocks obtained by dividing an image to be interpolated.

8. A method of generating an interpolation image, comprising:
inputting a video signal including a first reference image, a second reference image and a third reference image that continue in terms of time;
generating a plurality of first interpolation images by different interpolation image generation manners, respectively, using the first reference image and the third reference image, the first interpolation images corresponding to a position of the second reference image;
computing a correlation value between the second reference image and each of the first interpolation images;
selecting one of the interpolation image generation manners that the correlation value becomes maximum;
generating a second interpolation image put in an interpolation position between the second reference image and the third reference image according to a selected one of the interpolation image generation manners; and
interposing the second interpolation image in the interpolation position.

9. The method according to claim 8, wherein the computing computes the correlation value based on at least one of a differential value between images of a luminance component, a differential value between images of a color difference component, a differential value between images of a luminance component and a color difference component, a multiplication value between images of a luminance component, a division value between images of a luminance component, a multiplication value between images of a color difference component, a division value between images of a color difference component, a multiplication value between images of a luminance component and a color difference component, and a division value of a luminance component and a color difference component.

10. The method according to claim 8, wherein generating the first interpolation image includes generating the first interpolation image by at least one of (a) a manner of generating the first interpolation image by means of a motion vector between the first reference image and the third reference image, (b) a manner of generating the first interpolation image by obtaining an average of the first reference image and the third reference images according to distances of the first reference image and the third reference image with respect to the second reference image, and (c) a manner of determining the first reference image to the first interpolation image.

11. The method according to claim 8, wherein generating the second interpolation image includes generating the second interpolation image using a motion vector between the second reference image and the third reference image.

12. The method according to claim 8, wherein generating the second interpolation image includes generating the second interpolation image by calculating an average of the second reference image and the third reference image according to distances of the second reference image and the third reference image with respect to the interpolation position.

13. The method according to claim 8, which includes comparing the minimum of the correlation value with a threshold, and interposing the second reference image in the interpolation position when the minimum is not less than the threshold.

14. The method according to claim 8, wherein the computing includes computing the correlation value in units of a plurality of blocks obtained by dividing each of two images used for correlation computation.

15. The method according to claim 8, wherein the interposing includes interposing the second interpolation image in units of a plurality of blocks obtained by dividing an image to be interpolated.

16. A method of generating an interpolation image, comprising:
inputting a video signal including a first reference image, a second reference image and a third reference image that continue in terms of time;
generating a first interpolation image put in a position between the second reference image and the third reference image, using the second reference image and the third reference image;
generating, using the first interpolation image and a second interpolation image already interposed between the first reference image and the second reference image, a third interpolation image put in a position of the second reference image;
computing a correlation value between the second reference image and the third interpolation image; and
interposing the first interpolation image in the interpolation position when the correlation value is not less than a threshold.

17. The method according to claim 16, wherein the computing computes the correlation value based on at least one of a differential value between images of a luminance component, a differential value between images of a color difference component, a differential value between images of a luminance component and a color difference component, a multiplication value between images of a luminance component, a division value between images of a luminance component, a multiplication value between images of a color difference component, a division value between images of a color difference component, a multiplication value between images of a luminance component and a color difference component, and a division value of a luminance component and a color difference component.

18. A method of generating an interpolation image, comprising:
inputting a video signal including a first reference image, a second reference image and a third reference image that continue in terms of time;
generating a plurality of first interpolation images by different interpolation image generation manners, respectively, the first interpolation images put in an interpolation position between the second reference image and the third reference image;
generating, using the first interpolation image and a second interpolation image, a plurality of third interpolation images by the interpolation image generation manners, respectively, the second interpolation image already interposed between the first reference image and the second reference image, and the third interpolation images put in a position of the second reference image;

computing a correlation value between the second reference image and each of the third interpolation images selecting one of the interpolation image generation manners that the correlation value becomes maximum; and interposing, in the interpolation position, one of the first interpolation images that is generated according to a selected one of the interpolation image generation manners.

19. The method according to claim 18, wherein the computing computes the correlation value based on at least one of a differential value between images of a luminance component, a differential value between images of a color difference component, a differential value between images of a luminance component and a color difference component, a multiplication value between images of a luminance component, a division value between images of a luminance component, a multiplication value between images of a color difference component, a division value between images of a color difference component, a multiplication value between images of a luminance component and a color difference component, and a division value of a luminance component and a color difference component.

20. An interpolation image generating apparatus comprising:
a video input unit configured to input a video signal including a first reference image, a second reference image and a third reference image that continue in terms of time;
a first generator to generate a first interpolation image put in a position of the second reference image, using the first reference image and the third reference image;
a computation unit configured to compute a correlation value between the second reference image and the first interpolation image;
a second-generator to generate a second interpolation image put in an interpolation position between the second reference image and the third reference image; and
an interpolation unit configured to interpolate the second interpolation image in the interpolation position when the correlation value is not less than a threshold to generate an interpolated video signal.

21. An interpolation image generating apparatus comprising:
a video input unit configured to input a video signal including a first reference image, a second reference image and a third reference image that continue in terms of time;
a first generator to generate a plurality of first interpolation images by different interpolation image generation manners, respectively, using the first reference image and the third reference image, the first interpolation images corresponding to a position of the second reference image;
a computation unit configured to compute a correlation value between the second reference image and each of the first interpolation images;
a selector to select one of the interpolation image generation manners that the correlation value becomes maximum;
a second generator to generate a second interpolation image put in an interpolation position between the second reference image and the third reference image according to a selected one of the interpolation image generation manners; and
an interpolation unit configured to interpolate the second interpolation image in the interpolation position.

22. An interpolation image generating apparatus comprising:
a video input unit configured to input a video signal including a first reference image, a second reference image and a third reference image that continue in terms of time;
a first generator to generate a first interpolation image put in a position between the second reference image and the third reference image, using the second reference image and the third reference image;
a second generator to generate, using the first interpolation image and a second interpolation image already interposed between the first reference image and the second reference image, a third interpolation image put in a position of the second reference image;
a computation unit configured to compute a correlation value between the second reference image and the third interpolation image; and
an interpolation unit configured to interpolate the first interpolation image in the interpolation position when the correlation value is not less than a threshold.

23. An interpolation image generating apparatus comprising:
a video input unit configured to input a video signal including a first reference image, a second reference image and a third reference image that continue in terms of time;
a first generator to generate a plurality of first interpolation images by different interpolation image generation manners, respectively, the first interpolation images put in an interpolation position between the second reference image and the third reference image;
a second generator to generate, using the first interpolation image and a second interpolation image, a plurality of third interpolation images by the interpolation image generation manners, respectively, the second interpolation image already interposed between the first reference image and the second reference image, and the third interpolation images put in a position of the second reference image;
a computation unit configured to compute a correlation value between the second reference image and each of the third interpolation images;
a selector to select one of the interpolation image generation manners that the correlation-value becomes maximum; and
an interpolation unit configured to interpolate, in the interpolation position, one of the first interpolation images that is generated according to a selected one of the interpolation image generation manners.

24. A video display system comprising the interpolation image generating apparatus according to claim 20 and a display device configured to display the interpolated video signal generated by the interpolation image generating apparatus.

25. A method of generating an interpolated image, comprising:
inputting a video signal including a first reference image, a second reference image and a third reference image that continue in terms of time;

generating a first interpolation image put in a position of the second reference image, using the first reference image and the third reference image;

computing a correlation value between the second reference image and the first interpolation image;

generating a second interpolation image put in an interpolation position between the second reference image and the third reference image when the correlation value is not less than a threshold.

26. The method according to claim 25, wherein the computing computes the correlation value based on at least one of a differential value between images of a luminance component, a differential value between images of a color difference component, a differential value between images of a luminance component and a color difference component, a multiplication value between images of a luminance component, a division value between images of a luminance component, a multiplication value between images of a color difference component, a division value between images of a color difference component, a multiplication value between images of a luminance component and a color difference component, and a division value of a luminance component and a color difference component.

27. The method according to claim 25, wherein generating the first interpolation image includes generating the first interpolation image by at least one of (a) a manner of generating the first interpolation image by means of a motion vector between the first reference image and the third reference image, (b) a manner of generating the first interpolation image by obtaining an average of the first reference image and the third reference images according to distances of the first reference image and the third reference image with respect to the second reference image, and (c) a manner of determining the first reference image to the first interpolation image.

28. The method according to claim 25, wherein generating the second interpolation image includes generating the second interpolation image using a motion vector between the second reference image and the third reference image.

29. The method according to claim 25, wherein generating the second interpolation image includes generating the second interpolation image by calculating an average of the second reference image and the third reference image according to distances of the second reference image and the third reference image with respect to the interpolation position.

30. The method according to claim 25, wherein the computing includes computing the correlation value in units of a plurality of blocks obtained by dividing each of two images used for correlation computation.

* * * * *